(12) United States Patent
Pezzin et al.

(10) Patent No.: US 9,188,500 B2
(45) Date of Patent: Nov. 17, 2015

(54) INTERNAL FAULT INDICATOR FOR ELECTRICAL EQUIPMENT

(75) Inventors: Justin George Pezzin, Vancouver (CA); Adam John Hunsberger, Vancouver (CA); John Paul Chisholm, Vancouver (CA); Hyuk Jae Lee, Vancouver (CA)

(73) Assignee: IFD INTERNAL FAULT DETECTOR CORP., Vancouver, BC (CA)

( * ) Notice: Subject to any disclaimer, the term of this patent is extended or adjusted under 35 U.S.C. 154(b) by 441 days.

(21) Appl. No.: 13/703,005

(22) PCT Filed: Jun. 7, 2010

(86) PCT No.: PCT/CA2010/000836
§ 371 (c)(1),
(2), (4) Date: Dec. 7, 2012

(87) PCT Pub. No.: WO2011/153604
PCT Pub. Date: Dec. 15, 2011

(65) Prior Publication Data
US 2013/0074603 A1 Mar. 28, 2013

(51) Int. Cl.
*G01L 23/00* (2006.01)
*H01F 27/40* (2006.01)

(52) U.S. Cl.
CPC .............. *G01L 23/00* (2013.01); *H01F 27/402* (2013.01)

(58) Field of Classification Search
None
See application file for complete search history.

(56) References Cited

U.S. PATENT DOCUMENTS

| | | | |
|---|---|---|---|
| 3,680,359 A | 8/1972 | Lynch | |
| 3,812,816 A * | 5/1974 | Juhasz | 116/220 |
| 3,816,801 A * | 6/1974 | Almand, III | 361/37 |
| 3,855,503 A | 12/1974 | Ristuccia | |
| 3,972,364 A * | 8/1976 | Brumm | 137/485 |
| 4,010,708 A | 3/1977 | Keledy et al. | |
| 4,240,372 A | 12/1980 | Davis | |
| 4,494,566 A | 1/1985 | Sinclair et al. | |

(Continued)

FOREIGN PATENT DOCUMENTS

| | | |
|---|---|---|
| CN | 1436298 | 6/2000 |
| EP | 1252492 | 6/2010 |
| GB | 568055 | 3/1945 |
| GB | 1558414 | 1/1980 |

OTHER PUBLICATIONS

International search report for PCT/CA2010/000836, Dec. 7, 2012.

(Continued)

*Primary Examiner* — Robert R Raevis
(74) *Attorney, Agent, or Firm* — Brian S. Boyer; Syndicated Law, PC

(57) ABSTRACT

A fault indicator for indicating the occurrence of a rapid pressure surge within a housing of an electrical device has: a barrel capable of being mounted in an aperture of the housing; an actuating mechanism having a chamber with at least one orifice communicating between interior and exterior surfaces of the chamber within the housing and an actuating member movable in response to a pressure differential between the interior and exterior surfaces of the chamber; a plunger within the bore of the barrel biased outwardly in the barrel and normally retained in an armed position by the actuating member; and a radial seal disposed between the plunger and the barrel. When the pressure differential exceeds a positive threshold value, the actuating member is moved and thereby permits the plunger to move outwardly into a triggered position. The radial seal may be a dual-lip seal.

41 Claims, 17 Drawing Sheets

(56) References Cited

U.S. PATENT DOCUMENTS

| | | | |
|---|---|---|---|
| 4,654,643 | A | 3/1987 | Meisenheimer, Jr. |
| 4,823,224 | A | 4/1989 | Hagerman et al. |
| 4,831,957 | A | 5/1989 | Goans |
| 5,078,078 | A | 1/1992 | Cuk |
| 5,597,091 | A * | 1/1997 | Mah et al. ............ 222/3 |
| 5,623,891 | A | 4/1997 | Miller |
| 5,859,590 | A | 1/1999 | Otani |
| 5,946,171 | A | 8/1999 | Magnier |
| 6,429,662 | B1 | 8/2002 | Cuk et al. |
| 6,812,713 | B2 | 11/2004 | Cuk et al. |

OTHER PUBLICATIONS

CN Patent Office English translation of search report for PCT/CA2010/000836, Apr. 3, 2014.

International preliminary report on patentability for PCT/CA2010/000836, Dec. 7, 2012.

CN Patent Office English translation of 1$^{st}$ Office Action for PCT/CA2010/000836, Apr. 3, 2014.

Written opinion of the international search authority for PCT/CA2010/000836, Dec. 15, 2011.

\* cited by examiner

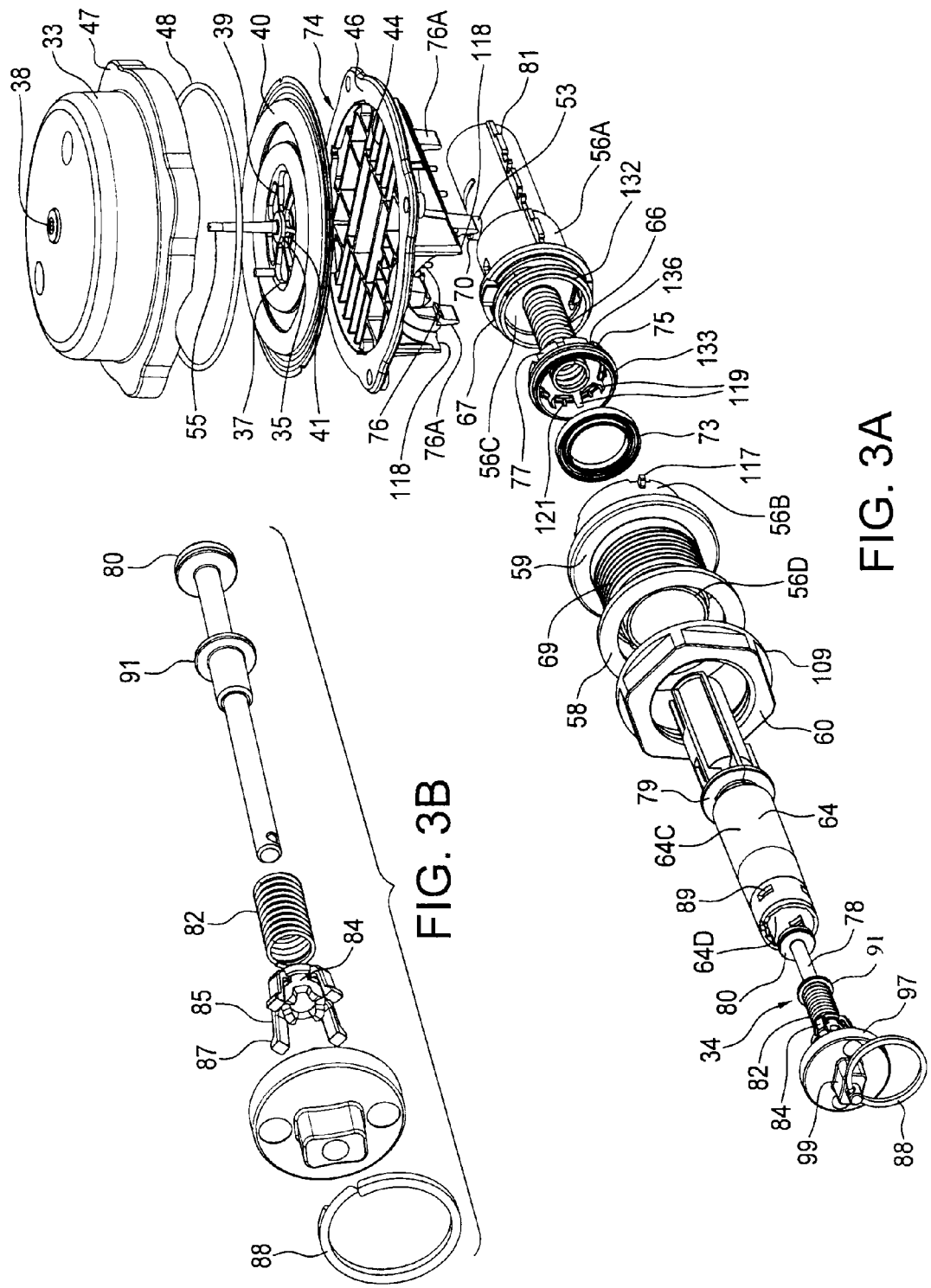

# INTERNAL FAULT INDICATOR FOR ELECTRICAL EQUIPMENT

CROSS-REFERENCE TO RELATED APPLICATIONS

This application is a National Stage of International Application No. PCT/CA2010/000836, filed on Jun. 7, 2010, which is herein incorporated by reference in its entirety.

TECHNICAL FIELD

This application relates to indicators for signaling the occurrence of internal faults in fluid-filled electrical equipment, such as transformers, reactors, capacitors and the like. Embodiments of the invention have particular application to electrical components used in electrical power distribution systems.

BACKGROUND

Electrical power distribution grids use electrical components, such as transformers, capacitors, and reactors. Potentially dangerous conditions can be created in such devices when aging or operating stresses cause the insulation system to fail. A short circuit within such a device can release a large amount of energy within a fraction of a second. In the worst case the device can explode due to rapid internal pressure buildup from the vaporization of insulating oil and the decomposition of the oil vapor into combustible or volatile gases.

Nearly all pole mounted distribution transformers are protected by a cutout which includes an expulsion fuse, current limiting fuse, or some other fast acting protective device. Such cutouts can minimize damage by disconnecting a faulty device from its source of electric energy so as to interrupt arc current in the event of an overload or internal fault. Service personnel can also use cutouts as manual switches for energizing or disconnecting particular circuits. If there is an overload in the system and the cutout operates, then service personnel can easily spot the open cutout and know that the transformer disconnected by the open cutout is out of service. If the fault is downstream of the transformer then, once that fault has been corrected, it is a simple matter for service personnel to re-fuse the cutout to re-energize the circuit. Similar types of protective fuses are also used in voltage regulators, and also in pad-mount transformers, where, for example, a bay-o-net fuse or current limiting fuse may be provided.

If the fault is in the transformer then closing the cutout before the transformer has been repaired will likely produce arcing within the transformer. A device that has failed once is certain to fail again if it is re-energized before the internal damage caused by the arcing has been corrected. Arcing can leave carbonized paths within the device and may impair the mechanical integrity of the device's housing, or "tank". This increases the risk that the device will fail catastrophically if it is re-energized. In extreme cases the transformer may explode. This could cause property damage and serious injury to service personnel and any members of the public who happen to be close by. To avoid this possibility service personnel must perform careful inspections and take special precautionary measures before attempting to re-energize any electrical apparatus found disconnected from the power system by its protective device.

Unfortunately, an internal fault can occur in a device without leaving any obvious visible cues that the fault has occurred in that device. Unless service personnel can tell that a particular device has failed they may reapply power to the device without detecting that the electrical device has failed. This may cause catastrophic failure of the electrical device, as noted above.

It is known that there is a transient or rapid surge in pressure inside oil-filled electrical devices, such as transformers or voltage regulators, when the devices suffer from an internal arcing fault. This happens because arcing produces a marked increase in temperature which vaporizes some of the oil. Some electrical devices are filled with electrically insulating gases such as $SF_6$. In such gas-filled devices arcing causes pressure surges in the gas. It is desirable to provide a device capable of detecting such transient pressure surges.

Space is at a premium inside the housing of a typical electrical device. This is especially the case in the top portion of the electrical device. A pressure relief valve and an internal fault indicator should both be in the air space at the top of the housing. In typical electrical devices, power leads also enter the housing through the upper air space region.

Additionally, it is important that the interior of a transformer or voltage regulator remain sealed from the outside atmosphere at all times during transportation and normal usage. The electrically insulating fluid or gas used inside such transformers may pose an environmental concern if permitted to leak from the device.

Documents of interest relating to indicators for detecting a transient pressure surge in an electrical device include U.S. Pat. No. 6,812,713 to Cuk et al., U.S. Pat. No. 6,429,662 to Cuk et al., and U.S. Pat. No. 5,078,078 to Cuk, each of which is hereby incorporated by reference herein.

In view of the foregoing, there remains a need for an internal fault indicator that can be readily installed and used with an electrical component with a minimum risk of being incorrectly installed or deployed, and further which remains sealed at all times during normal transportation and use of the electrical device, including after deployment of the indicator.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

A fault indicator for indicating the occurrence of a rapid pressure surge within a housing of an electrical device has: a barrel capable of being mounted in an aperture in the housing; an actuating mechanism with a chamber within the housing, the chamber having at least one orifice communicating between interior and exterior surfaces of the chamber, and an actuating member movable in response to a pressure differential between the interior and exterior surfaces of the chamber; a plunger within a bore of the barrel, the plunger being biased outwardly in the barrel and normally retained in an armed position by the actuating member; and a radial seal disposed between the plunger and the barrel so as to permit relative motion of the plunger and the barrel. When the pressure differential exceeds a positive threshold value, the actuating member is moved and thereby permits the plunger to move outwardly into a triggered position. The radial seal is sealingly engaged with both the plunger and the barrel in both the armed position and the triggered position.

In some embodiments, the radial seal is a dual-lip seal. In some embodiments, the chamber includes a diaphragm and the actuating member is coupled to the diaphragm. The fault indicator may further include a diaphragm positioning member. In some embodiments, the diaphragm positioning member is a pair of opposed projecting tabs that engage with an upper surface of the barrel. The fault indicator may further include an O-ring in sealing engagement with an outer perimeter of the diaphragm and an outer perimeter of the chamber.

In some embodiments, the fault indicator includes a pressure relief valve integral with the plunger. The pressure relief valve may include an axially movable valve member disposed within a bore of the plunger and biased into engagement with a valve seat by a spring. One end of the spring may contact a centering feature formed on the valve member. A spring retainer may be disposed within the bore of the plunger to secure the spring and a dust cover engageable with an outer end of the plunger. The spring retainer may have a first plurality of insert tabs and the dust cover may have a second plurality of insert tabs, and the first and second plurality of insert tabs are sized and disposed to be engageable in the installed position. One or both of the first and second plurality of insert tabs may have rounded edges.

In some embodiments, a stop ring is provided within the bore of the barrel and positioned to prevent complete ejection of the plunger when the fault indicator is triggered. The stop ring may include a plurality of axially inwardly extending arms defining drainage channels therebetween.

In some embodiments, the internal fault indicator includes a removable lock on an outer end of the barrel, the lock blocking outward motion of the plunger in the bore. The lock may have a radially inwardly directed flange that is engageable with one or more than one receiving slots on the outer end of the barrel to secure the lock to the barrel.

An electrical device having a closed housing can include an internal fault indicator within the chamber in the housing and the barrel projecting through an aperture in the housing. One or more active electrical components are within the housing. The electrical device may be a pole-mounted transformer, or may be a pad mounted transformer.

In some embodiments, the fault indicator has pressure surge detecting means for moving an actuating member in response to a rapid rise in pressure within a housing of an electrical device, indicator means actuated by the pressure surge detecting means, the indicator means being a plunger movably disposed within a bore, and a radial seal disposed within the bore and around the plunger. The plunger is movable outwardly in the bore from an armed position to a triggered position upon movement of the actuator, and the radial seal maintains a sealing engagement with the plunger in both the armed and triggered positions while permitting relative motion of the plunger and the bore between the armed and triggered positions.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 3A is an exploded view of the embodiment of FIG. 2.

FIG. 3B is an exploded view of the pressure relief valve of the embodiment of FIG. 2.

FIG. 9A shows a perspective view of the seal, FIG. 9B shows a side view of the seal, and FIG. 9C shows a front view of the seal.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

An internal fault indicator according to the present invention may be used with a variety of high power electrical devices, including pole-type transformers, padmount transformers, or voltage regulators.

Figure 1:
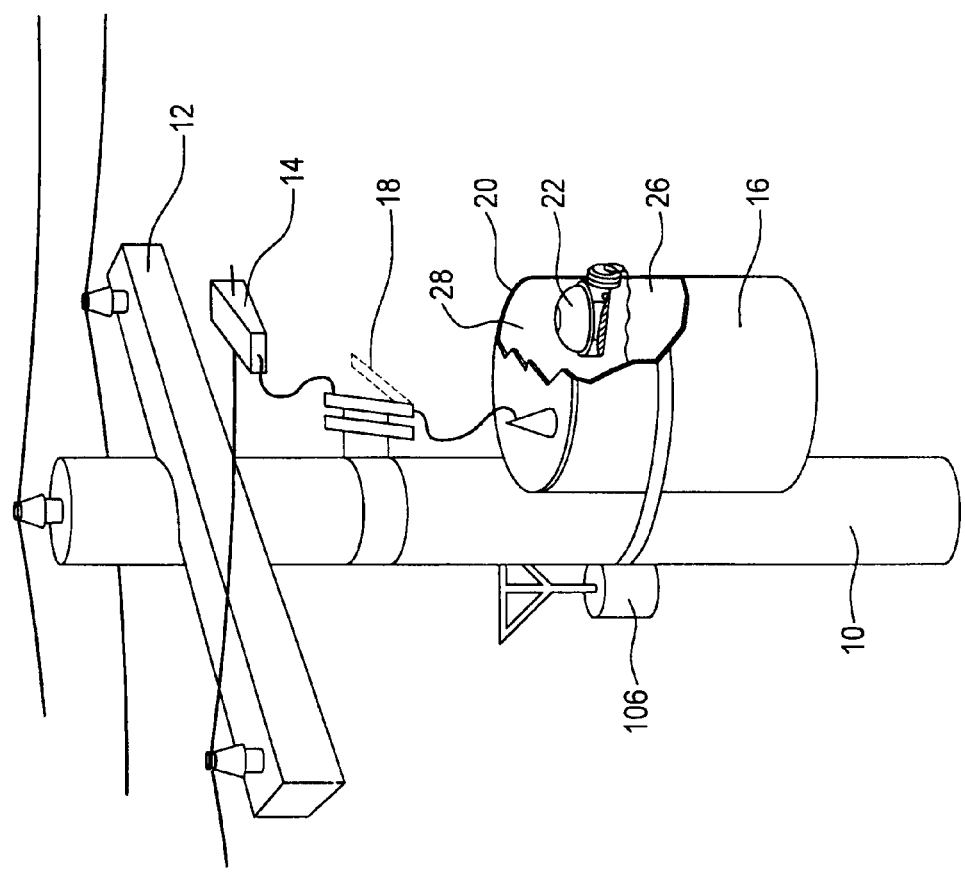
FIG. 1 is a partially cut away schematic view of an electrical power transformer, mounted on a power distribution pole, equipped with an internal fault indicator according to the invention and connected to an energy supply.

With reference to FIG. 1, one embodiment of an internal fault indicator may be used in conjunction with a pole-type transformer. FIG. 1 shows a typical distribution pole 10 with a crossarm 12 supporting power lines 14. The illustrated embodiment shows an oil-filled transformer. Embodiments of the invention can also be used with gas-filled transformers.

A transformer 16 is mounted on the pole 10 and is connected via a fused cutout 18 to one of the lines 14. When cutout 18 opens, it hinges downwardly as illustrated in dashed outline in FIG. 1. This breaks the circuit between transformer 16 and line 14.

Transformer 16 has a housing or "tank" 20. An embodiment of an internal fault indicator 22 (which could also be called an internal fault detector) is mounted in an aperture 24 in a side wall of housing 20 (best shown in FIG. 8B). In some embodiments, aperture 24 may be a small hole, and may have a diameter of approximately 1.35 inches (34.0 mm), which is a commonly used hole size for inserting various equipment onto transformers and the like. Housing 20 contains electrically insulating fluid 26, which may be for example an oil such as insulating mineral oil or Nynas Nytro™ (made from naphthenic oils), or an ester-based fluid such as Envirotemp FR3™ fluid (made from seeds), or an electrically insulating gas such as $SF_6$. Internal fault indicator 22 is located in an air space 28 above the level of electrically insulating fluid 26 in housing 24 for fluid-filled transformers, or preferably above the core or coil for gas-filled transformers.

For clarity, the term "inwardly" is used herein to refer to a direction towards the interior of housing 20 when indicator 22 is installed on housing 20, and "outwardly" is used to refer to the opposite direction. The term "upwardly" is used herein to refer to a direction towards the top of housing 20, and "downwardly" is used to refer to the opposite direction. However, it will be appreciated that the directional terms used herein are used in a relative sense with respect to the relative orientation of components in indicator 22 in the installed position. Deployment of indicator 22 in other orientations relative to housing 20 (for example at a slight angle) is possible.

Figure 2:
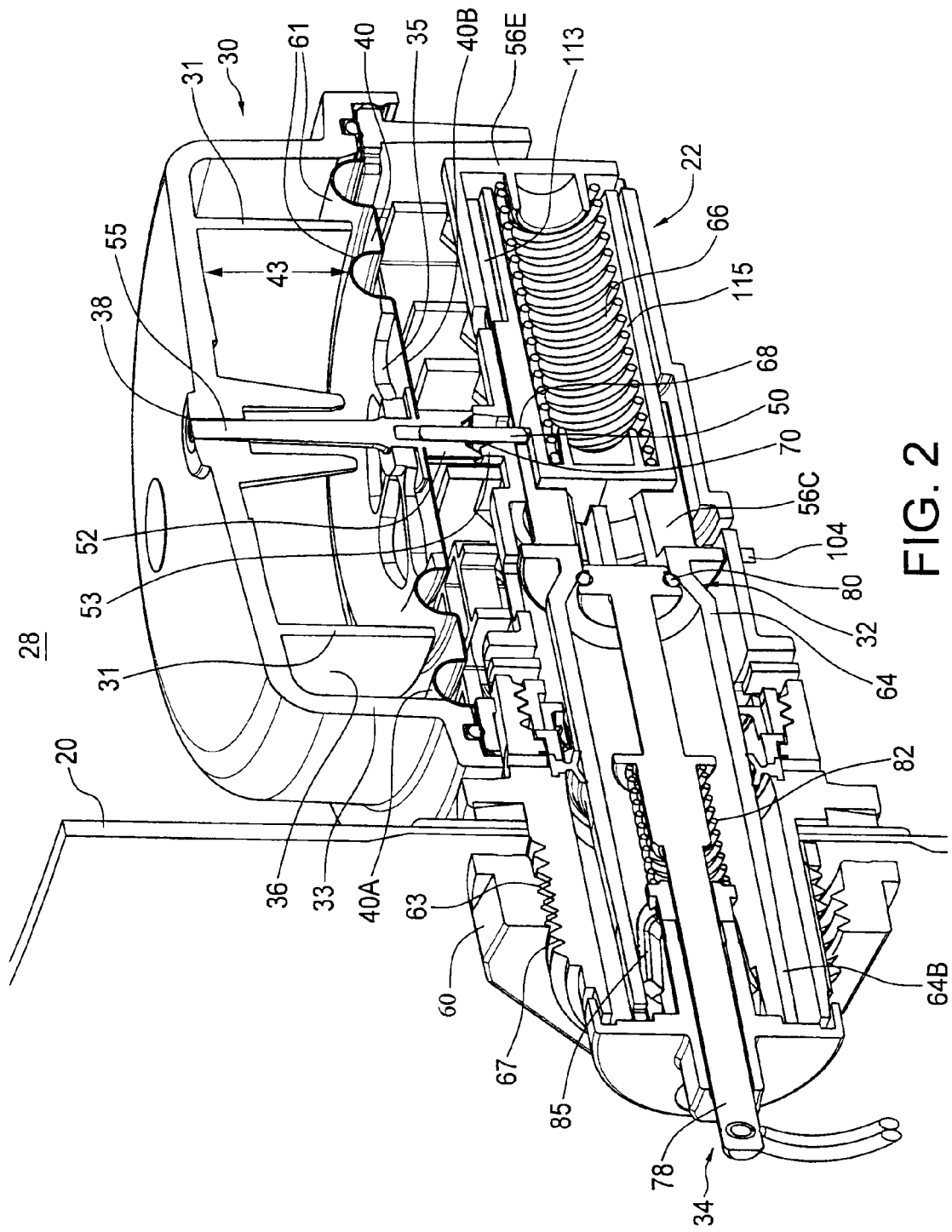
FIG. 2 is a cross-sectional view of an embodiment of an internal fault indicator, with some components removed for clarity.

With reference to FIGS. 2, 3A and 3B, internal fault indicator 22 has an actuator mechanism, indicated generally by 30, which detects transient pressure surges within housing 20, and an indicator mechanism, indicated generally by 32, which changes appearance when the actuator mechanism 30 has detected a transient pressure surge. As used herein, "transient pressure surge" means a change in pressure that is greater than approximately 0.25 to 1.5 pounds per square inch within a time period of approximately 5-7 milliseconds. Different embodiments of indicator 22 may have different levels of sensitivity to a transient pressure surge, depending on the desired application. Alternative ways of modulating the sensitivity of indicator 22 are discussed below.

When there is a breakdown of the insulation surrounding the energized or "active" components of transformer 16, an arc is created. The electric arc dissipates large amounts of energy. The sudden dissipation of energy within housing 20 causes a sharp rise in the pressure within housing 20. Even at levels of short circuit current on the order of 100 amperes, or less, the pressure within housing 20 rises at a rate which is distinctly higher than any other pressure fluctuations that are reasonably expected to occur during normal operation of transformer 16. This rapid pressure rise, i.e. a transient pressure surge, is detected by actuator mechanism 30, which triggers indicator mechanism 32. That is, a transient pressure surge causes indicator 22 to be triggered from an armed state to a deployed state.

To facilitate normal operations and pressure changes expected during normal operating conditions, internal fault indicator 22 may include a pressure relief valve 34. If the pressure rises to a value which is greater than the set point of pressure relief valve 34, then pressure relief valve 34 opens until the pressure has been relieved. The pressure within housing 20 may rise to a level capable of opening pressure relief valve 34 as a result of normal fluctuations in ambient temperature and loading. Service personnel may also manually operate pressure relief valve 34, as described below, to equalize the ambient pressure inside housing 20 with the air pressure outside of housing 20.

As best illustrated in FIGS. 2 and 3A, actuator mechanism 30 has a chamber 36 which is open to the interior of housing 20 only by way of a small orifice 38. In the illustrated embodiment, a diaphragm 40, which functions as a gas barrier, forms one wall of chamber 36. A second wall of chamber 36 is provided by shell 33. Shell 33 may include supporting member 31, which may be provided by a downwardly extending ring concentric with shell 33, to protect diaphragm 40 from damage that could be caused by excessive deflection. In the illustrated embodiment, a spindle 35 is provided to further support diaphragm 40. Spindle 35 has an outer radial portion 37 which is generally circular, with a plurality of inwardly extending arms 39 that connect outer portion 37 with a central support 41. Other designs and configurations for the spindle may also be used to support diaphragm 40. For example, the spindle may be formed from a plurality of connected concentric rings, as a sheet of suitably resilient material, or the like.

Diaphragm 40 has one face 40A in chamber 36 and a second face 40B exposed to the ambient pressure within housing 20. Chamber 36 is preferably roughly semi-spherical so that it can occupy a reasonably small space within housing 20, although chamber 36 may have other shapes. Diaphragm 40 preferably has a reasonably large surface area so that pressure differentials across diaphragm 40 will generate sufficient forces to trigger indicator mechanism 32. In some embodiments, diaphragm 40 may have a diameter of 3 inches or more. In other embodiments, smaller diameters may be used for diaphragm 40. For maximum reliability and sensitivity, in fluid-filled electrical devices, diaphragm 40 should face downward toward the surface of the fluid 26 in housing 20 and be generally parallel therewith. In gas-filled electrical devices, diaphragm 40 should preferably be oriented towards the core or coil of the device.

The size and shape of chamber 36 can also affect the sensitivity of indicator mechanism 32. For example, the height 43 of chamber 36 above surface 40A of diaphragm 40 affects the sensitivity, and different heights can be used depending on the type of equipment in which internal fault indicator 22 is deployed. For example, in transformers or voltage regulators having a larger air space, a larger cup volume may be provided, e.g. by making height 43 taller.

Because air can enter or leave chamber 36 by way of orifice 38, the air pressure within chamber 36 will track relatively slow changes in ambient pressure within housing 20. Such changes might occur, for example, when the temperature within transformer 16 changes. On the other hand, if the pressure within housing 20 increases very suddenly, the air pressure within chamber 36 will take some time to increase because of the small size of orifice 38. In response to a transient pressure surge, diaphragm 40 should move far enough to reliably trigger indicator mechanism 32. During this period, the pressure on face 40B of diaphragm 40 will temporarily significantly exceed the pressure on face 40A. Diaphragm 40 is thus pushed inwardly toward chamber 36. A transient pressure surge would occur, for example, if an electrical fault in the active components of transformer 16 caused an electrical arc within housing 20. Diaphragm 40 should be insensitive to fluctuations in the ambient pressure within housing 20 which occur more slowly than about 1 psi per second.

A splash cover 44 may be provided to dampen the effects of oil splashing onto diaphragm 40, as might occur, for example, if housing 20 was shaken by an earthquake. A diaphragm spacer 46 may interpose diaphragm 40 and splash cover 44 to elevate diaphragm 40 above the surface of splash cover 44. In the illustrated embodiment of FIG. 3A, splash cover 44 and diaphragm spacer 46 are integrally formed as a single unit. Forming splash cover 44 and diaphragm spacer 46 as a single unit provides an indicator 22 which has fewer parts and may be easier to assemble, and may also provide for greater consistency in deployment of indicator 22 from unit to unit.

Shell 33 may be secured to splash cover 44 and/or diaphragm spacer 46 in any suitable manner (e.g. by clips, clamps, adhesives, or the like). Shell 33 and splash cover 44 may additionally be provided with one or more welded anti-tamper points 47, to ensure that shell 33 cannot be easily opened once device 22 has been assembled. Shell 33 and/or splash cover 44 may also be provided with one or more prypoints (illustrated as 49 in FIG. 7), i.e. a ledge or support formed therein to provide a leverage point to assist in prying shell 33 and splash cover 44 apart.

A suitable seal, such as an O-ring 48 may be provided around the outer perimeter of diaphragm 40 to improve the seal between diaphragm 40 and chamber 36 and thereby increase the sensitivity of actuator mechanism 30. O-ring 48 interposes surface 40A and chamber 36. The presence of O-ring 48 may improve the sensitivity of internal fault indicator 22 by improving the seal around chamber 36, and thus a smaller chamber 36 may be used than would be the case in the absence of O-ring 48.

An axial guide rod 55 extending from diaphragm 40 may project into orifice 38. In such embodiments, the location of the end of axial guide rod 55 projecting through orifice 38 can be used to verify that diaphragm 40 has been properly located within chamber 36 during assembly. A trigger pin 50 extends downwardly from diaphragm 40 to retain plunger 64 in position until actuator mechanism 30 is triggered.

One or more diaphragm-locating members may be provided to assist in consistent positioning of diaphragm 40 and trigger pin 50. In the illustrated embodiment, a pair of opposed tabs 52 are provided that extend downwardly from axial guide rod 55 adjacent face 40B. In some embodiments, tabs 52 and axial guide rod 55 may be integrally formed. Tabs 52 engage with a lip 53 on the upper surface of trigger notch 68 on barrel 56 to ensure consistent spacing between barrel 56 and diaphragm 40.

Figure 4A:
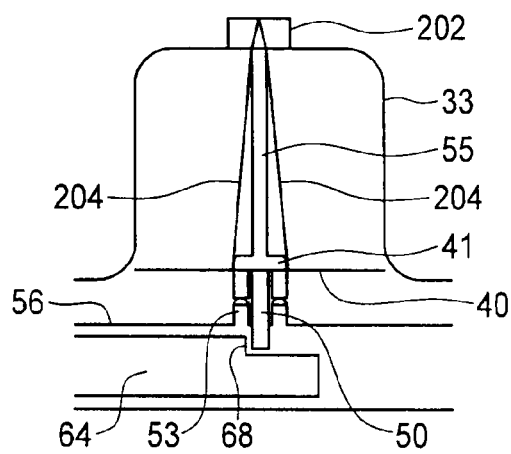
FIGS. 4A-4F show partial cross-sectional schematic views of six different embodiments including various configurations for a diaphragm locating member.
Figure 4B:
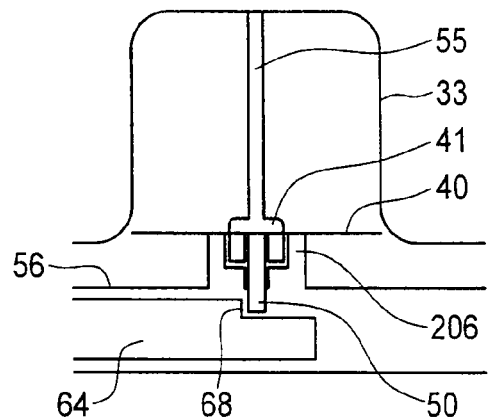
Figure 4C:
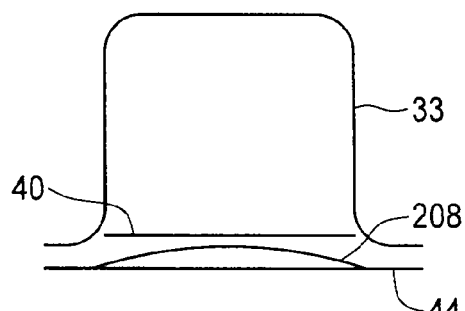
Figure 4D:
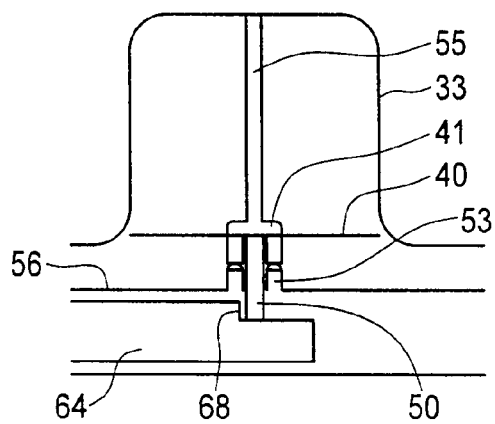
Figure 4E:
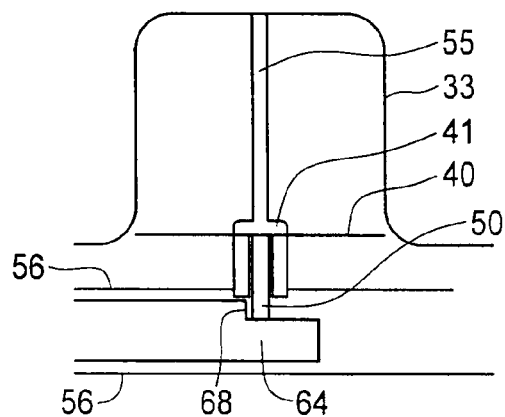
Figure 4F:
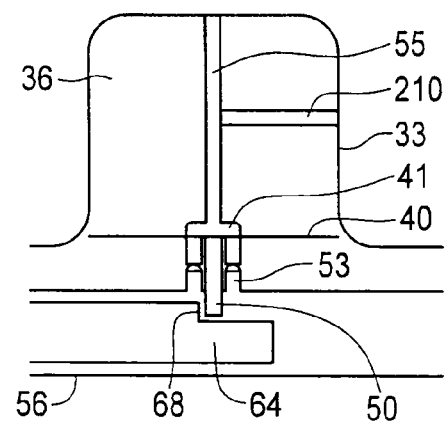

Alternative configurations for the diaphragm locating member are possible, so long as the diaphragm locating member is configured to support diaphragm 40 in a consistent orientation without causing damage thereto. For example, tabs 52 could instead be formed as a supporting ring concentric with and extending downwardly from axial guide rod 55 that engages with lip 53. Alternatively, a suitable diaphragm-locating member such as tabs 52 could engage with other portions of barrel 56, or with splash cover 44, so long as the tabs are appropriately located to ensure consistent positioning of diaphragm 40. Other configurations may be used. As illustrated in partial schematic cross-sectional view in FIG. 4A, a pair of feet 202 could be provided to engage with the upper surface of shell 33 of chamber 36 and support a vertical support string 204 extending downwardly into chamber 36. Vertical support string 204 may be coupled to spindle 35, diaphragm 40, or central support 41 of the spindle to support and position diaphragm 40. With reference to FIG. 4B, support ring 53 could instead be vertically extended to provide a diaphragm support 206, which could engage with diaphragm 40 or central support 41 of spindle 35. With reference to FIG. 4C, shown without spindle 35 for clarity, a plurality of arcing ribs 208 may be provided on splash cover 44 to contact and support diaphragm 40. As shown in FIG. 4D, trigger pin 50 may be permitted to rest upon plunger 64 at trigger notch 68 to vertically support diaphragm 40. Alternatively, a portion of barrel 56 could be cut away, as shown in FIG. 4E, to allow an extended portion of central support 41 of spindle 35 to project downwardly into bore 56C of barrel 56 to facilitate contact of trigger pin 50 with plunger 64. In such an embodiment, support ring 53 is omitted. In the further alternative, as shown in FIG. 4F, the diaphragm locating member could be provided by a grip 210 that is connected to axial guide rod 55 and is clipped, fastened or otherwise secured to a portion of chamber 36.

Consistent positioning of diaphragm 40 assists in ensuring reproducibility of the deployment of indicator mechanism 32 by actuator mechanism 30. The diaphragm locating member may also guard against deflection of diaphragm 40 during manufacture and assembly, which assists in preventing damage to diaphragm 40 due to rapid pressure increases during manufacture of transformer 16 or other electrical device. However, the diaphragm locating member should be designed to ensure that damage to diaphragm 40 does not occur by reason of its presence, as could potentially occur for example if the design of the diaphragm locating member creates a fulcrum.

Movement of diaphragm 40 in response to a transient pressure surge triggers indicator mechanism 32. In the illustrated embodiment, trigger pin 50 projects from face 40B of diaphragm 40. Trigger pin 50 may be press fit into a hub 51 located in the central portion of diaphragm 40. Under normal operating conditions, chamber 36 is exposed to various mechanical vibrations and shocks including seismic tremors. To avoid false triggering by such mechanical vibrations, and to permit rapid operation, the mass of diaphragm 40 should be small.

Figure 5A:
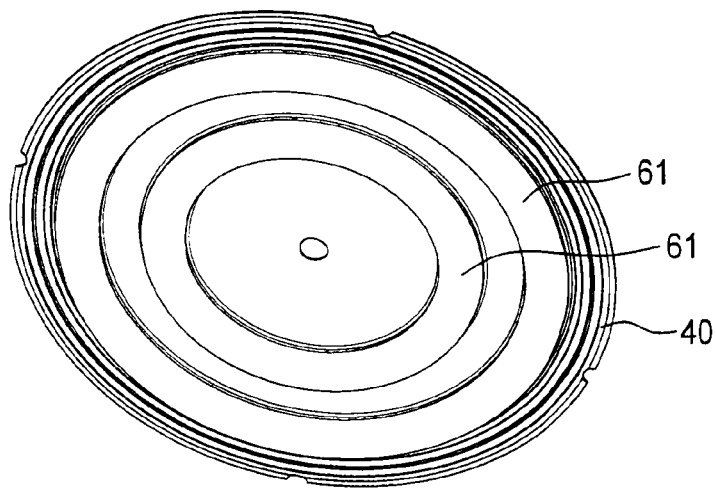
FIGS. 5A-5C show three different potential configurations for a diaphragm.
Figure 5B:
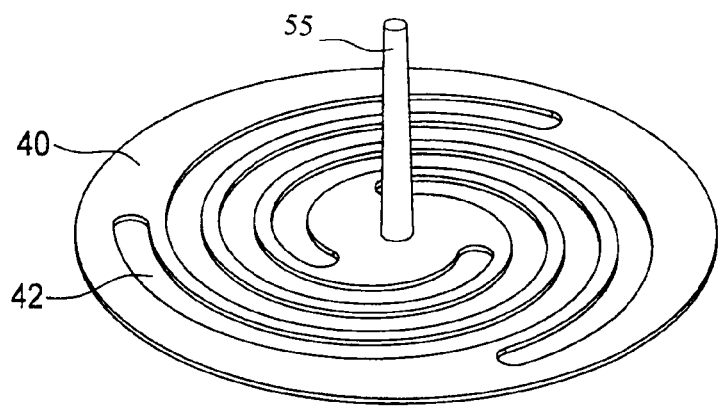
Figure 5C:
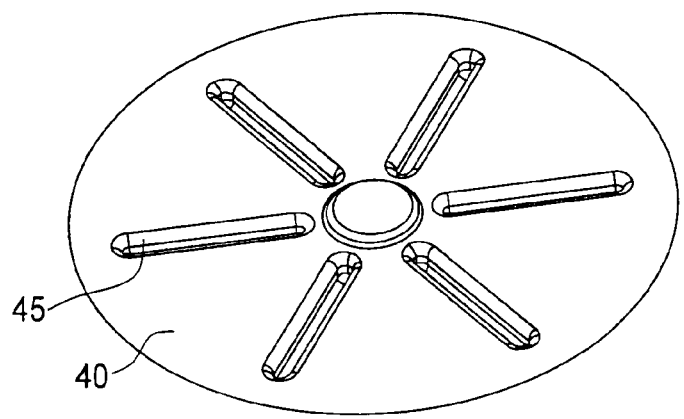

In some embodiments, diaphragm 40 may be constructed from a suitably resilient plastic of a thickness to provide a detectable movement to activate actuator mechanism 30 as described below in response to a transient pressure surge. In the illustrated embodiment of FIG. 2, diaphragm 40 is a sheet of a lightweight stiff material, such as a thin sheet of a suitably resilient plastic (such as, for example a polyester or a polybutylene terephtalate (PBT)), formed to provide a number of concentric annular ridges 61 (shown also in FIG. 5A). In some embodiments, diaphragm 40 may have a thickness in the range of 10 mm, although other thicknesses such as 5 mm may also be used. This diaphragm configuration has been found to provide good sensitivity to the occurrence of faults. Additionally, a supporting structure such as spindle 35 may be provided to further support diaphragm 40. Alternatively, a compliant substructure such as a spiral spring 42 (shown in FIG. 5B) may be provided to support diaphragm 40. Spiral spring 42 may optionally be integrally formed with diaphragm 40. Diaphragm 40 may comprise a thin layer of an air impermeable material such as 5 millimeter polyethylene film, if supported by a compliant substructure such as spiral spring 42. Spiral spring 42 may be fabricated from a thin sheet of a suitably resilient plastic. Alternatively, as illustrated in FIG. 5C, diaphragm 40 may be a sheet of stiff, lightweight material with radially extending ribs 45 formed integrally with it.

Figure 6:
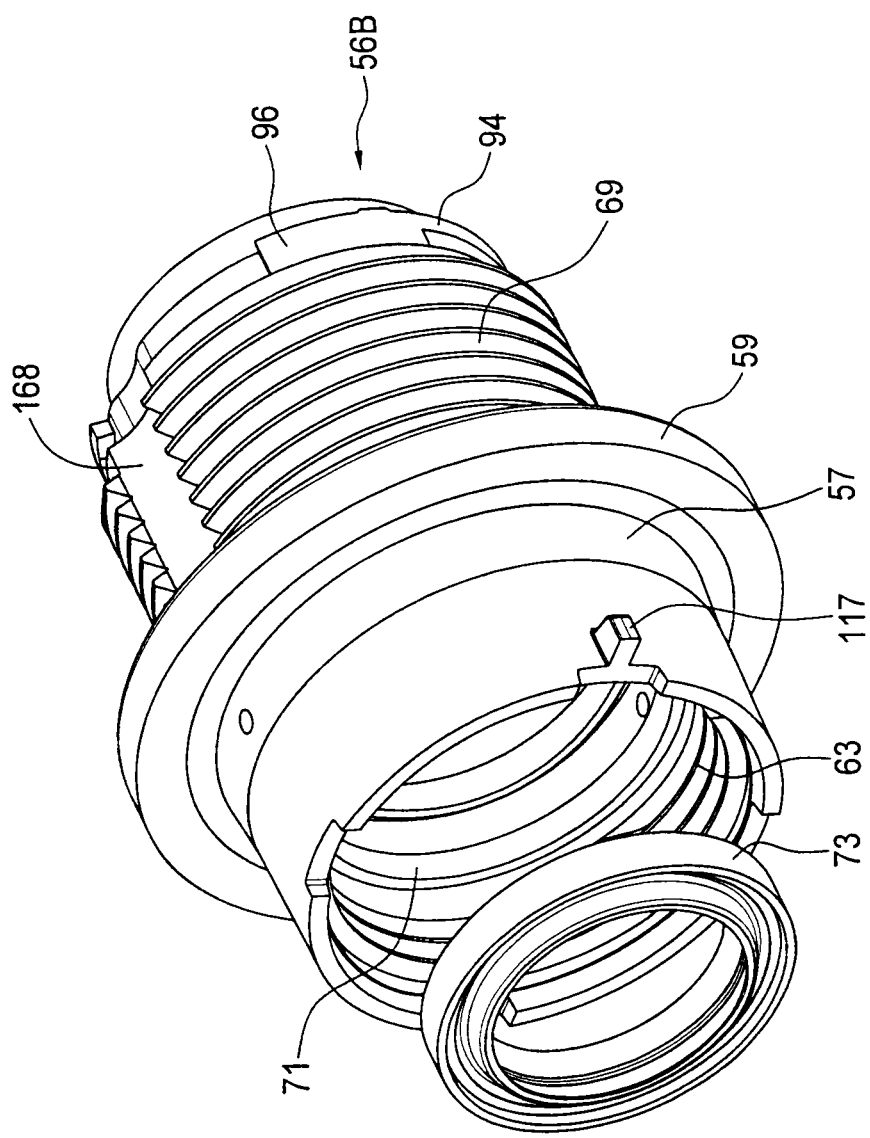
FIG. 6 is a perspective view of an outer portion of a barrel and a radial seal of an embodiment of an internal fault indicator.

Indicator mechanism 32 has a barrel 56. In the illustrated embodiment, barrel 56 has two separate portions, inner portion 56A and outer portion 56B. Outer portion 56B is the portion which passes through housing 20 and may include a slightly tapered portion 57 (FIG. 6), which contacts housing 20 and assists in sealing internal fault indicator 22 against housing 20. Outer portion 56B may be coupled to inner portion 56A in any suitable manner, for example by providing correspondingly threaded engageable surfaces 63 on the inner surface of portion 56B and 67 on the outer surface of portion 56A as illustrated, or by suitable adhesives or a friction fit or the like. Outer portion 56B may also optionally be provided with a projection 117 to prevent portions 56A and 56B from being unthreaded from one another after device 22 has been assembled. Projection 117 engages with surfaces 118 on the outer portion of splash cover 44 when indicator 22 is assembled to prevent relative rotation of portions 56A and 56B.

Figure 7:
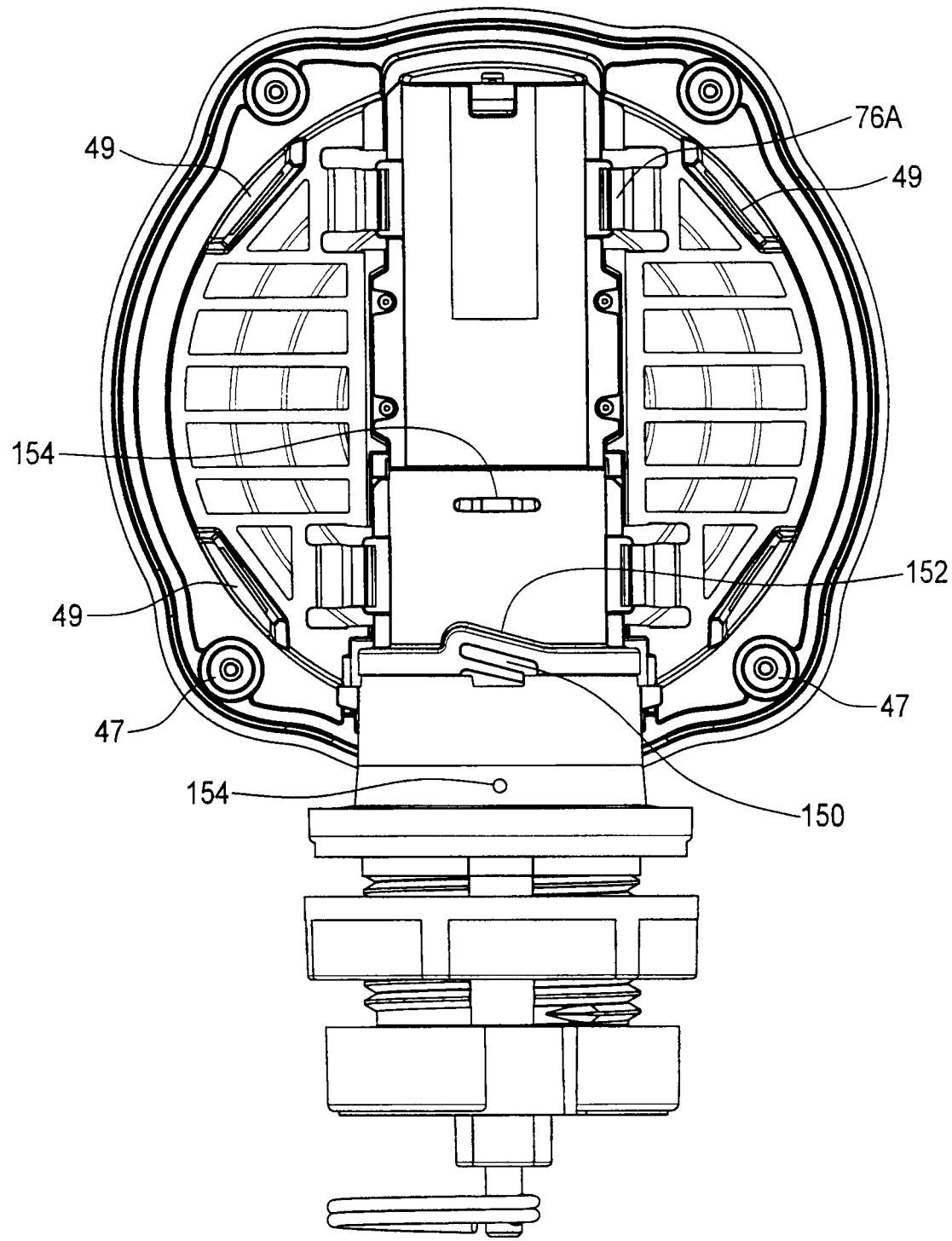
FIG. 7 is a bottom plan view of an embodiment of an internal fault indicator including an anti-rotation tab and drainage apertures.

Barrel 56 may be provided with an anti-rotation element such as locking tab 150 shown in FIG. 7. Locking tab 150 engages with locking slot 152 to prevent relative rotation of inner and outer portions 56A and 56B. To separate inner and outer portions 56A and 56B, a user may depress locking tab 150 away from slot 152, thereby permitting portions 56A and 56B to rotate relative to one another. Any other mechanism suitable for preventing relative rotation of portions 56A and 56B when installed could be used as an anti-rotation element.

Outer portion 56B of barrel 56 projects through aperture 24 and includes an outer flange 59. An all weather gasket 58 interposes a nut 60 threaded onto an outer threaded shoulder 69 of outer portion 56B and outer flange 59. Nut 60 is tightened against the interior wall surface of housing 20 to ensure the integrity of the seal around aperture 24. In some embodiments, nut 60 may be made thicker than one skilled in the art would typically find necessary for use, in order to provide greater strength and facilitate easier assembly of internal fault indicator 22 into housing 20 (e.g. by providing a greater surface area to facilitate manually grasping and securing nut 60 by hand). Nut 60 may also be provided with a collared shoulder 109 to provide a greater surface area for engaging housing 20 and to prevent indicator 22 from sliding within or through aperture 24.

Figure 8A:
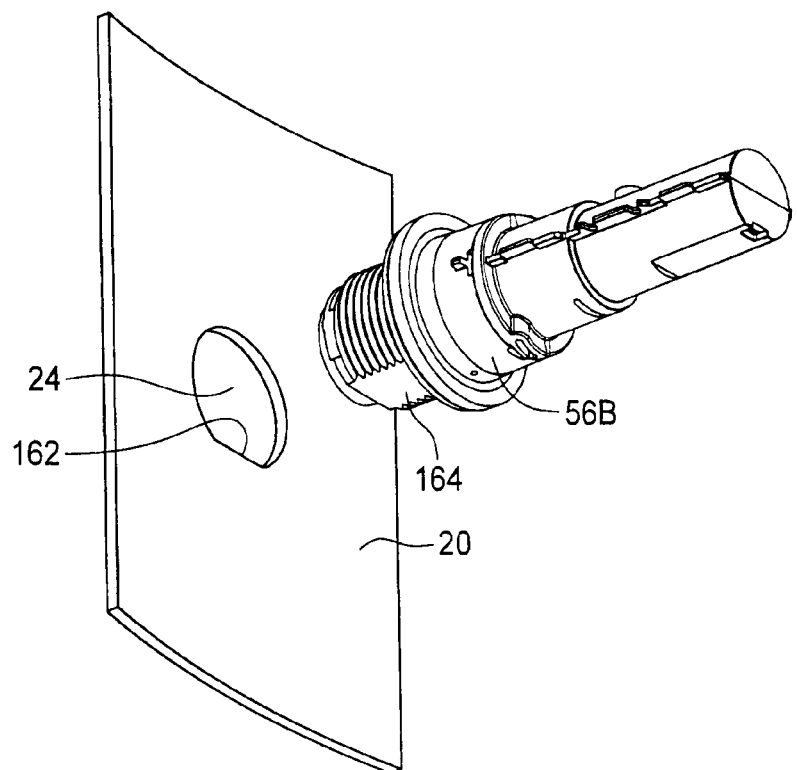
FIG. 8A is a schematic view showing one possible arrangement for preventing the rotation of a barrel of an embodiment of an internal fault indicator in an aperture in a housing.
Figure 8B:
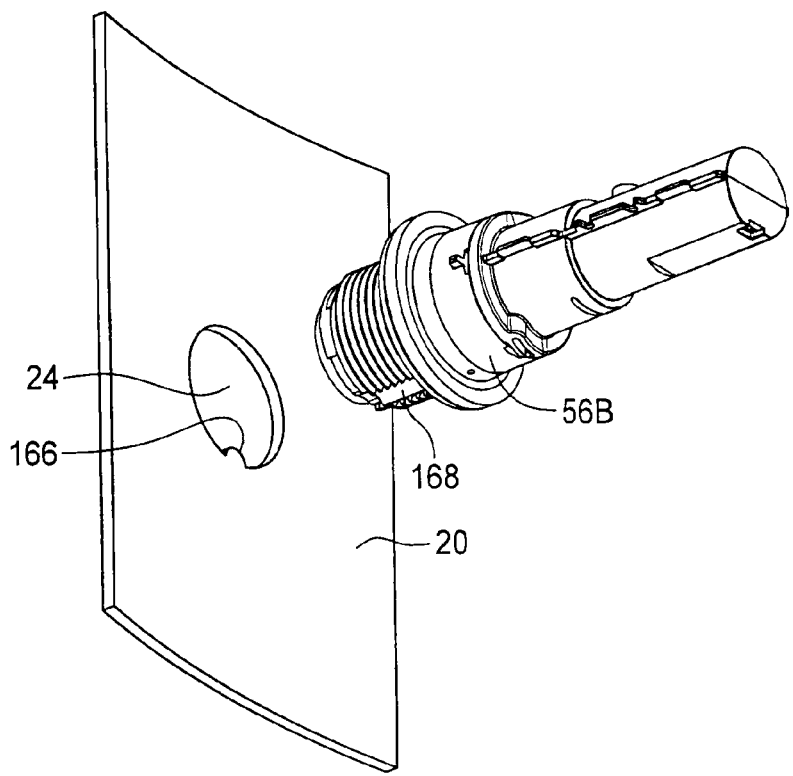
FIG. 8B is a schematic view showing another possible arrangement for preventing the rotation of a barrel of an embodiment of an internal fault indicator in an aperture in a housing.

Barrel 56 should be prevented from rotating in aperture 24, particularly for a liquid-filled electrical device, and also to facilitate easier assembly of indicator 22. This may be accomplished, for example, by making aperture 24 D-shaped with a flat portion 162 which engages a corresponding flat portion 164 on outer portion 56B of barrel 56 (see FIG. 8A). FIG. 8B shows an alternative construction which prevents rotation of barrel 56 relative to aperture 24. In the embodiment of FIG. 8B, a projection 166 on housing 20 engages a notch 168 in outer portion 56B. Increasing the depth of notch 168 and the size of projection 166 can provide for more reliable insertion and retention of internal fault indicator 22 into housing 20.

Preferably barrel 56 is small enough to fit into an aperture which is approximately 1.35 inches (34.0 mm) in diameter. Barrel 56 is made of non-conductive material so that barrel 56 does not provide a conductive path through the wall of housing 20. Barrel 56 may, for example, be fabricated from fiber-reinforced polypropylene with additives to provide resistance to degradation by the action of sunlight and/or to improve flammability properties. For example, polybutylene terephthalate, optionally with glass-fiber reinforcement, in combination with suitable additives, may be used.

A plunger 64 is located within a bore 56C of barrel 56. Plunger 64 is urged outwardly relative to housing 20 in any suitable manner, for example by an eject spring 66 (shown as a compression spring in the illustrated embodiment) which is compressed between a receiving cavity 115 within inner end 64A of plunger 64 and an inwardly projecting flange (not shown) formed at an inner end 56E of barrel 56, or with inner end 56E of barrel 56. The eject spring could alternatively be an extension spring arranged to pull plunger 64 outward in bore 56C in place of the illustrated compression spring, or any other suitable type of spring.

Outer portion 56B of barrel 56 includes an internal flange 71 that supports a seal 73 and a barrel stop ring 75, described below. Seal 73 is a radial seal that engages the outer surface of plunger 64 and the inner surface of barrel 56 to maintain a seal between the interior of housing 20 and the external atmosphere when internal fault indicator 22 is in either an armed state or a deployed state. Maintenance of a seal between the interior of housing 20 and the external atmosphere as aforesaid assists in ensuring that electrically insulating fluid 26 (or gas) remains contained inside of housing 20, while external elements such as moisture and dust are not permitted to enter housing 20. Use of a radial seal has certain advantages over prior art designs such as the axial seal shown in U.S. Pat. Nos. 6,429,662 and 6,812,713 to Cuk, in that the sealing of radial seal 73 is independent of the compression force applied to retain indicator 22 in the armed state, and further a radial seal may maintain a seal between plunger 64 and barrel 56 in both the armed and deployed states of indicator 22.

A variety of different types of seals suitable for operation under low pressure may be used for radial seal 73, such as an O-ring, quad ring, X-ring, scraper seal, rod seal, or piston seal. One skilled in the art may select an appropriate seal for radial seal 73 based on the operating characteristics of the many different types of seals that are readily commercially available. One or more than one radial seal 73 may be used.

Figure 9C:
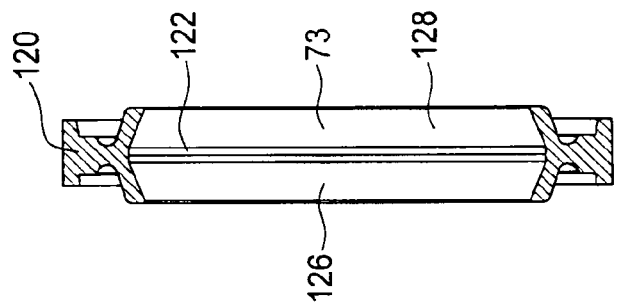
FIGS. 9A-9C show a close up view of a dual lip cylinder seal that may be used as a radial seal in some embodiments.
Figure 9B:
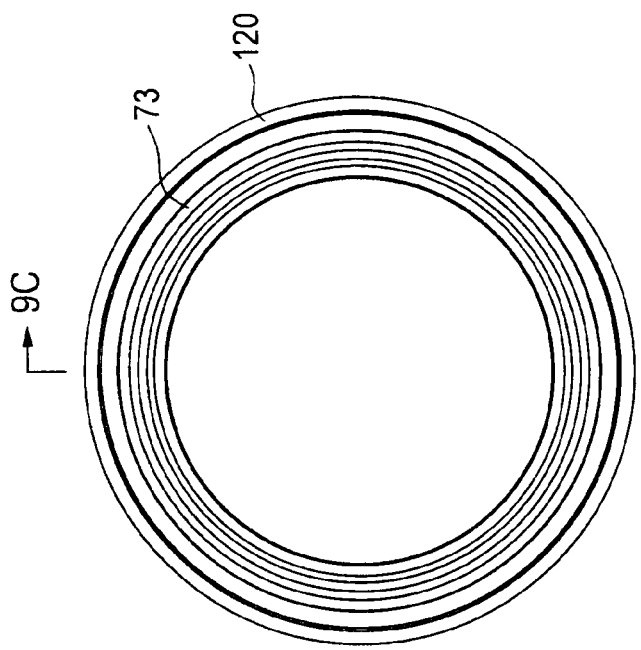
Figure 9A:
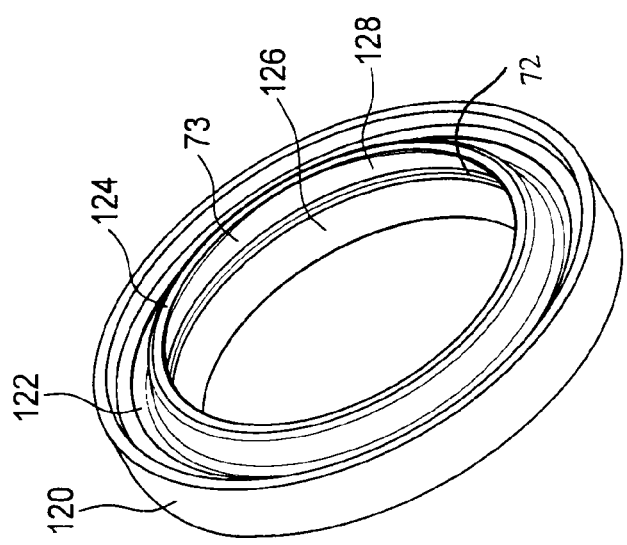

In the illustrated embodiment, and in preferred embodiments, seal 73 is a dual lip cylinder seal, i.e. as best shown in FIG. 2 and with further reference to FIG. 9, seal 73 has two points of contact with the outer surface of plunger 64. Seal 73 is a generally circular ring having a circumferential outer seal portion 120, a connecting groove 122 positioned just inwardly of outer seal portion 120, and a central seal portion 124 which has two inner circumferential sealing lips 126, 128, that extend axially outwardly from a radial centreline 72 of seal 73. When positioned within indicator 22, outer seal portion 120 sealingly contacts the inner portion of bore 56C of barrel 56 and inner circumferential sealing lips 126, 128 are bent axially and radially inwardly to sealingly engage the outer surface of plunger 64. Lips 126, 128 are configured to permit relative movement of plunger 64 past barrel 56 and seal 73.

In some embodiments, seal 73 may be formed by overmolding to provide a good sealing engagement with outer portion 56B of barrel 56. Seal 73 is thus retained in a stationary position with respect to barrel 56, while plunger 64 can move relative to seal 73 and in sealing engagement therewith via sealing lips 126, 128. Seal 73 could alternatively be formed and retained in a stationary position with respect to plunger 64, while permitting relative motion of barrel 56 relative to plunger 64. If so, the orientation of outer seal portion 120 and sealing lips 126, 128 would be reversed, i.e. the dual lip cylinder seal would be provided with an inner seal portion for contacting the barrel, and the sealing lips would be provided on the outer surface of the seal.

Seal 73 may be formed from any suitably resilient material, for example a 2000 series Alcryn™ melt-processable rubber may be used. The hardness (i.e. durometer) of the material may be selected to ensure that a seal is maintained through the range of normally expected operating conditions of internal fault indicator 22, and to provide a low friction engagement with plunger 64. Characteristics of the friction, flex, and profile provided by seal 73 can be varied by the type of material used to construct seal 73. In some embodiments, seal 73 may have a hardness in the range of 50-90 shore A durometer. In some embodiments, seal 73 may have a hardness in the range of 80 shore A durometer. Seal 73 should be made from a material capable of sealing in a variety of types of fluids, e.g. mineral oil or ester-based fluids, or electrically insulating gas that may be used in an electrical device.

Figure 10A:
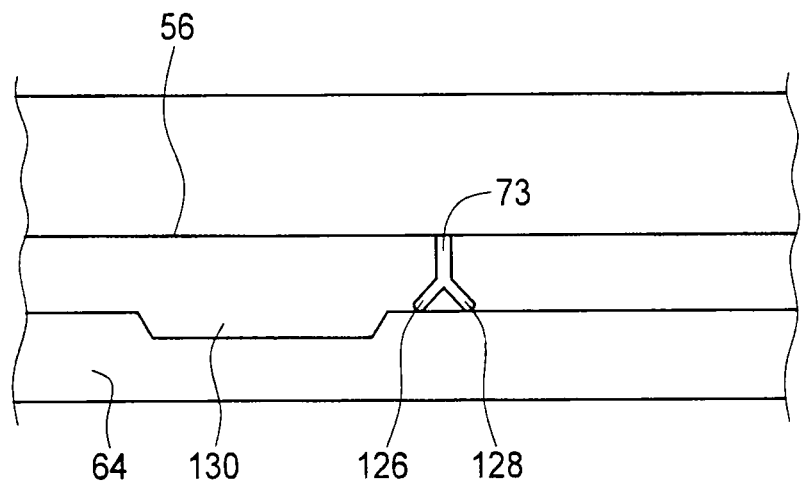
FIG. 10A shows a schematic view of an embodiment of an internal fault indicator wherein a portion of the plunger is cut away to permit detachment of the radial seal during deployment in the armed position.
Figure 10B:
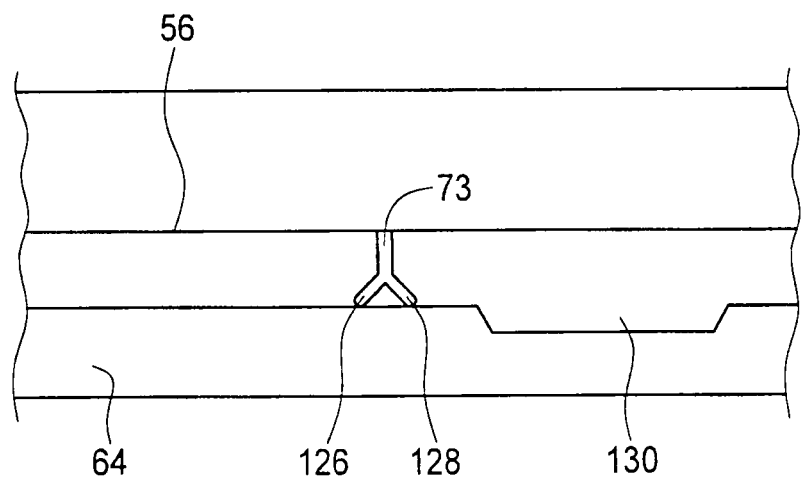
FIG. 10B shows the same embodiment in the triggered position.

In some embodiments, lips 126, 128 of seal 73 provide a constant volume interaction with the body of plunger 64, i.e. a seal is maintained between barrel 56 and plunger 64 throughout the movement of plunger 64 from the armed to the deployed state. In other embodiments, as shown in FIGS. 10A and 10B, a small portion of the outer surface of plunger 64 may be removed to provide a depression 130. Depression 130 is sized and configured such that sealing lips 126, 128 make sealing contact with plunger 64 in both the armed and the deployed state, but sealing lips 126, 128 pass by depression 130, thereby moving out of sealing engagement with plunger 64, during part or all of the movement of plunger 64 from the armed to the deployed state.

A barrel stop ring 75 (see FIG. 3A) is provided to retain plunger 64 within bore 56C when internal fault indicator 22 is activated. In the illustrated embodiment, barrel stop ring 75 is a circular ring that encircles plunger 64 and engages with a stopping flange 79 on plunger 64 and an outer edge 132 of inner portion 56A of barrel 56 to prevent complete ejection of plunger 64 from barrel 56 when internal fault indicator 22 is triggered, or upon occurrence of a catastrophic event. Seal 73 is retained against stop ring 75 by internal flange 71 formed in outer portion 56B of barrel 56 and positioned outwardly from threaded surface 63. Barrel stop ring 75 also protects seal 73 from damage when plunger 64 is triggered, and is therefore positioned inwardly of seal 73.

In the illustrated embodiment, barrel stop ring 75 has a plurality of axially inwardly extending arms 77. Arms 77 define channels 136 therebetween, which facilitate drainage of any fluid that may splash onto barrel stop ring 75. In the illustrated embodiment, barrel stop ring 75 also has a flanged edge 133 that contacts outer edge 132 of inner portion 56A of barrel 56. Barrel stop ring 75 may also have a plurality of radially inwardly extending projections 119 on the inner surface thereof to prevent complete ejection of plunger 64 from device 22, and optionally a plurality of smaller radially inward facing projections 121 that may provide additional support to retain plunger 64 in horizontal alignment with barrel 56, for example should forces be applied against plunger 64 by a person pulling on ring 88, while still minimizing any frictional forces generated should plunger 64 come into contact with barrel stop ring 75 when internal fault indicator 22 is triggered.

One or more apertures may preferably be provided through the lower surface of barrel 56 to facilitate drainage of any fluid therefrom. In the illustrated embodiment, drainage apertures 154 (FIG. 7) are provided on both inner and outer portions 56A and 56B of barrel 56. To further facilitate drainage of fluid away from seal 73, the inside of exterior portion 56B may be slightly bevelled outwardly away from internal flange 71, so that any moisture that enters exterior portion 56B drains away from seal 73.

Until internal fault indicator 22 is triggered, plunger 64 is prevented from being ejected from barrel 56 by the engagement of trigger pin 50 in a trigger notch 68 in plunger 64. Trigger pin 50 passes into bore 56C of barrel 56 through a chamfered guide opening 70. Diaphragm 40 provides a slight force which tends to seat trigger pin 50 in trigger notch 68. Alternatively, in some embodiments, a compliant substructure such as spiral spring 42, shown in FIG. 5B, or a spring 114 shown in the embodiment illustrated in FIG. 11, may provide a slight spring force which tends to seat trigger pin 50 in trigger notch 68. Upon occurrence of a transient pressure surge, diaphragm 40 actuates trigger pin 50 out of engagement with trigger notch 68, thereby releasing plunger 64, which is moved outwardly through the action of spring 66.

Figure 12A:
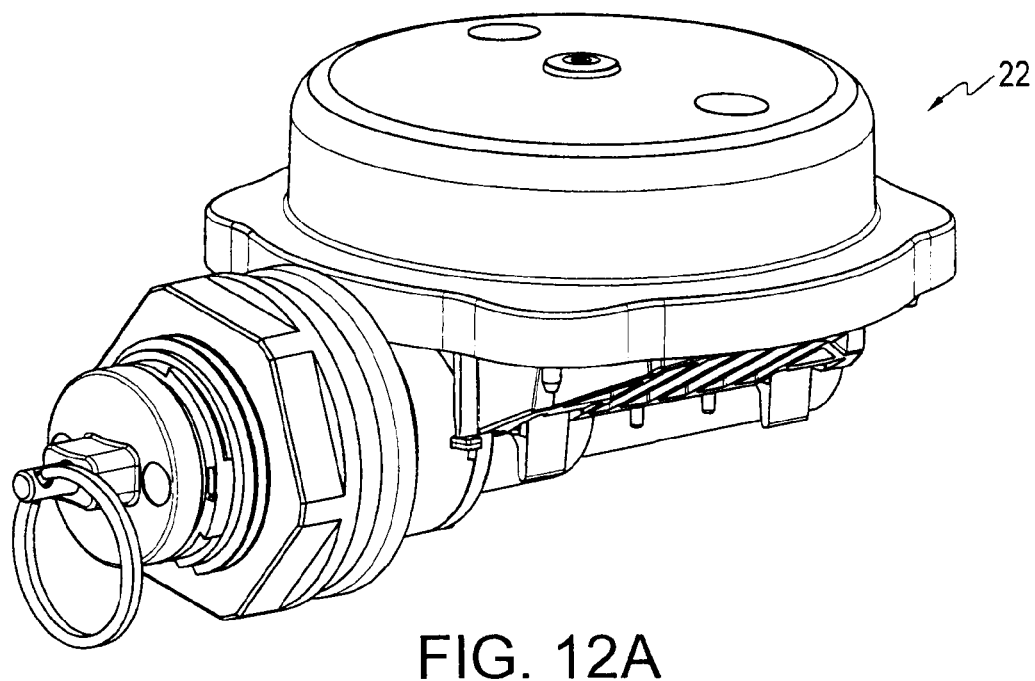
FIG. 12A is a perspective view of an embodiment of an internal fault indicator in an armed state.
Figure 12B:
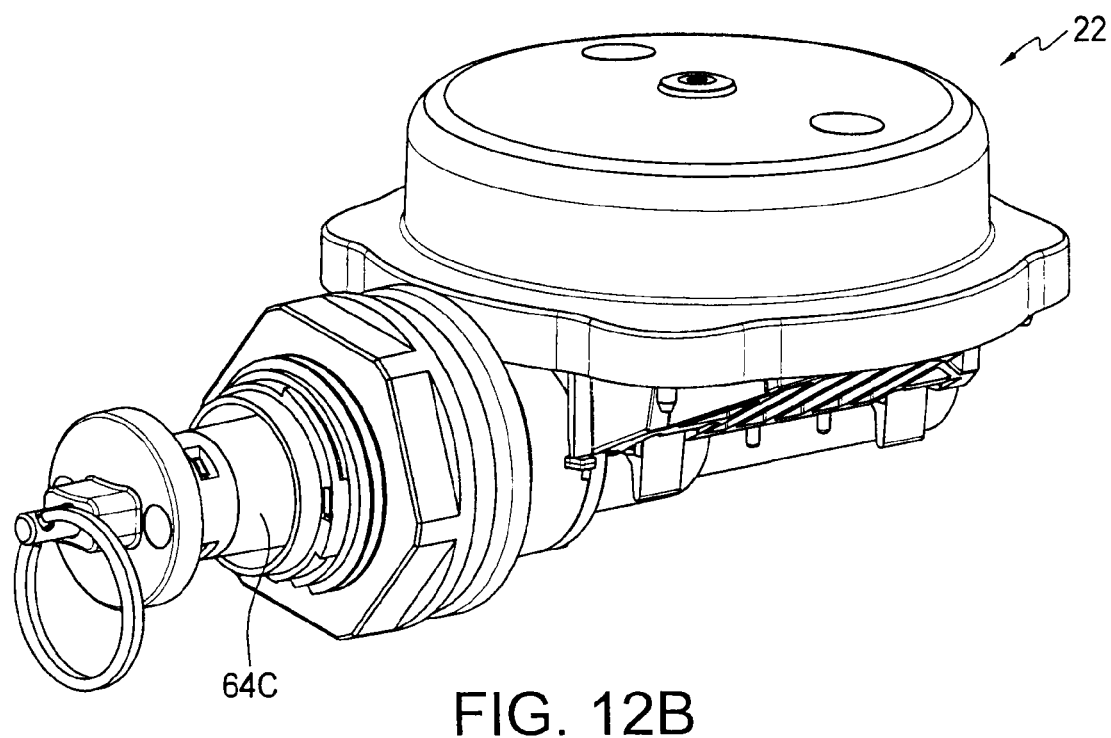
FIG. 12B is a perspective view of an embodiment of an internal fault indicator in a deployed state.

FIG. 12A shows indicator 22 in the armed state, while FIG. 12B shows indicator 22 in the deployed state. Preferably, after plunger 64 has been pushed outward in bore 56C, the outer end of plunger 64 extends significantly beyond the outer opening of barrel 56. This provides a highly visible indication that a fault has occurred in transformer 16. The shape of internal fault indicator 22 is thus changed after plunger 64 has been ejected. Furthermore, the side surface 64C of plunger 64, or a portion thereof, may be brightly coloured, and may have a colour which has high contrast to the colours typically found in the environment of transformer 16. Suitable colours include bright colours such as blaze orange and bright yellow. Thus, after plunger 64 has been ejected, its brightly coloured side surface 64C is exposed to view and is easy to see. Internal fault indicator 22 can be mounted in a side wall of housing 20, thereby permitting it to display an indication that an internal fault has occurred in a location which is readily visible from the ground.

Shortly after plunger 64 has been pushed outward in barrel 56, the pressure in chamber 36 will equalize with the ambient pressure within housing 20. This causes diaphragm 40 to resume its normal position. When diaphragm 40 has resumed its normal position, trigger pin 50 projects into bore 56C, thereby blocking plunger 64 from being pushed back into bore 56C. Trigger pin 50 may block plunger 64 by engaging with a rear portion 65 of the plunger, or alternatively with a notch or other feature (shown as securing notch 113 in FIGS. 2 and 15C) located on plunger 64 at a location to the rear of trigger notch 68. This prevents transformer 16 from being put unknowingly back into service without having passed an internal inspection. In general, whenever an electrical device has malfunctioned in a way that has triggered internal fault indicator 22, the device should be opened and inspected before it is put back into service. Providing an indicator element which cannot be returned to its initial position after internal fault indicator 22 has been triggered without opening housing 20 reduces the likelihood that, through human error, an electrical device will be placed back into use before it has been properly inspected and serviced. As an alternative, a separate pawl or other one-way ratchet mechanism could be provided so that internal fault indicator 22 can be reset only from inside housing 20.

Figure 11:
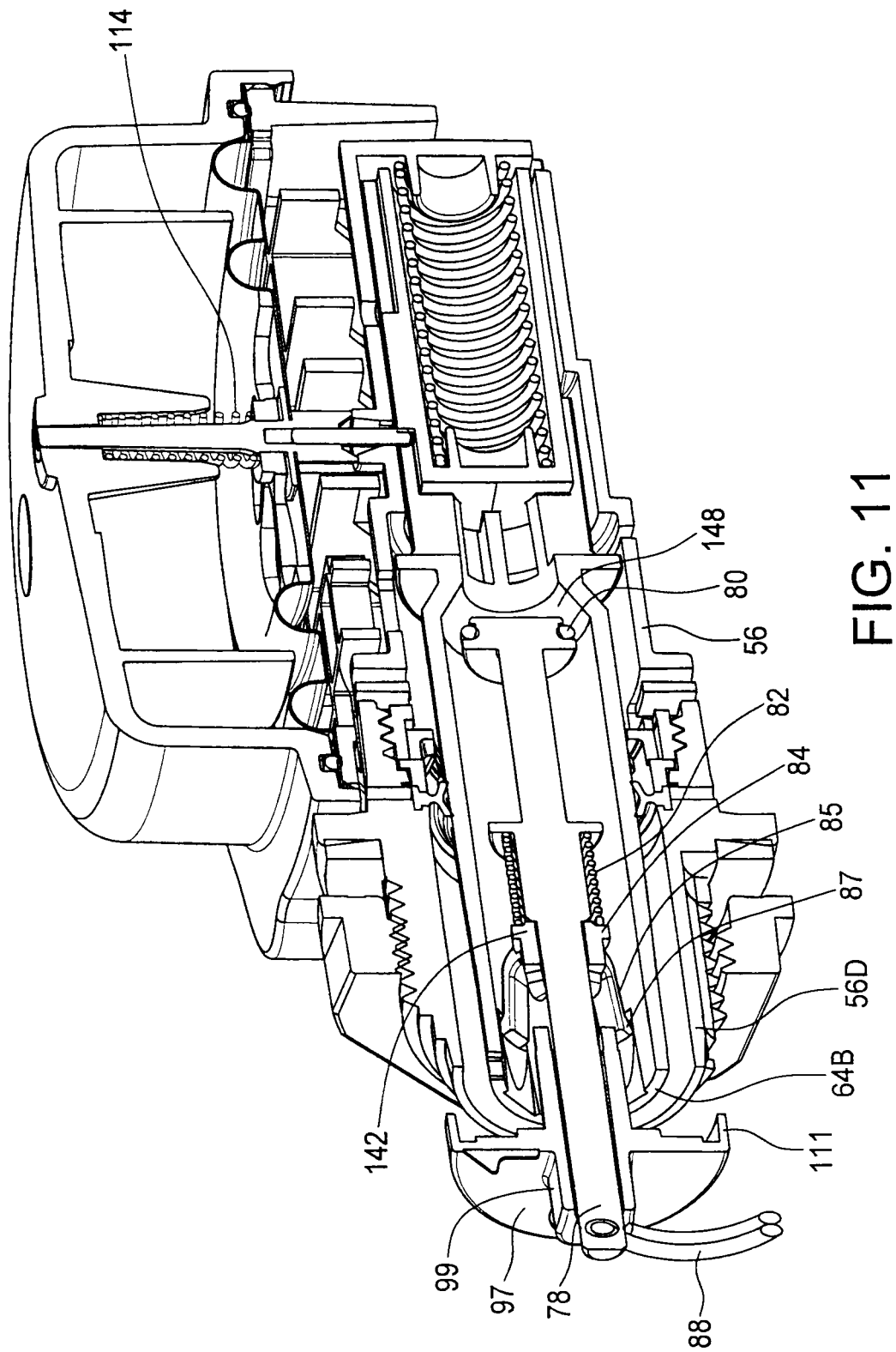
FIG. 11 is a partial sectional view of an internal fault indicator according to an embodiment of the invention wherein a coil spring is used to provide a bias force on a trigger pin, which shows the pressure relief valve in the open configuration.

Pressure relief valve 34 may be made integral with plunger 64 and is contained within an outer portion 64B of plunger 64. Pressure relief valve 34 has an axially movable valve member 78 which is biased into engagement with a valve seat 80 by a low rate spring 82. Ordinarily, valve member 78 is sealingly biased against valve seat 80 to maintain a seal between the external atmosphere and the interior or housing 20, thereby preventing moisture ingress into the interior of housing 20. If the ambient pressure within housing 20 exceeds the atmospheric pressure outside of housing 20 then there is a net outward force on the end of valve member 78. When this force exceeds a predetermined value, for example, a force corresponding to a pressure differential of 5 psi, 7 psi or 10 psi, spring 82 will compress and allow gases to vent from housing 20 through a venting gap 148 (FIG. 11). The predetermined value at which gases will be permitted to vent may be varied by varying the characteristics of low rate spring 82, for example by varying the length of the uncompressed spring, the number of active turns, wire diameter, inner and outer diameter, or otherwise varying the spring constant thereof. For ease of reference, springs to be used in pressure relief valve 34 may be color coded depending on the range of pressures that will activate a pressure relief valve containing that spring. The venting characteristics of pressure relief valve 34 may also be varied by varying the diameter of the venting gap.

Figure 13:
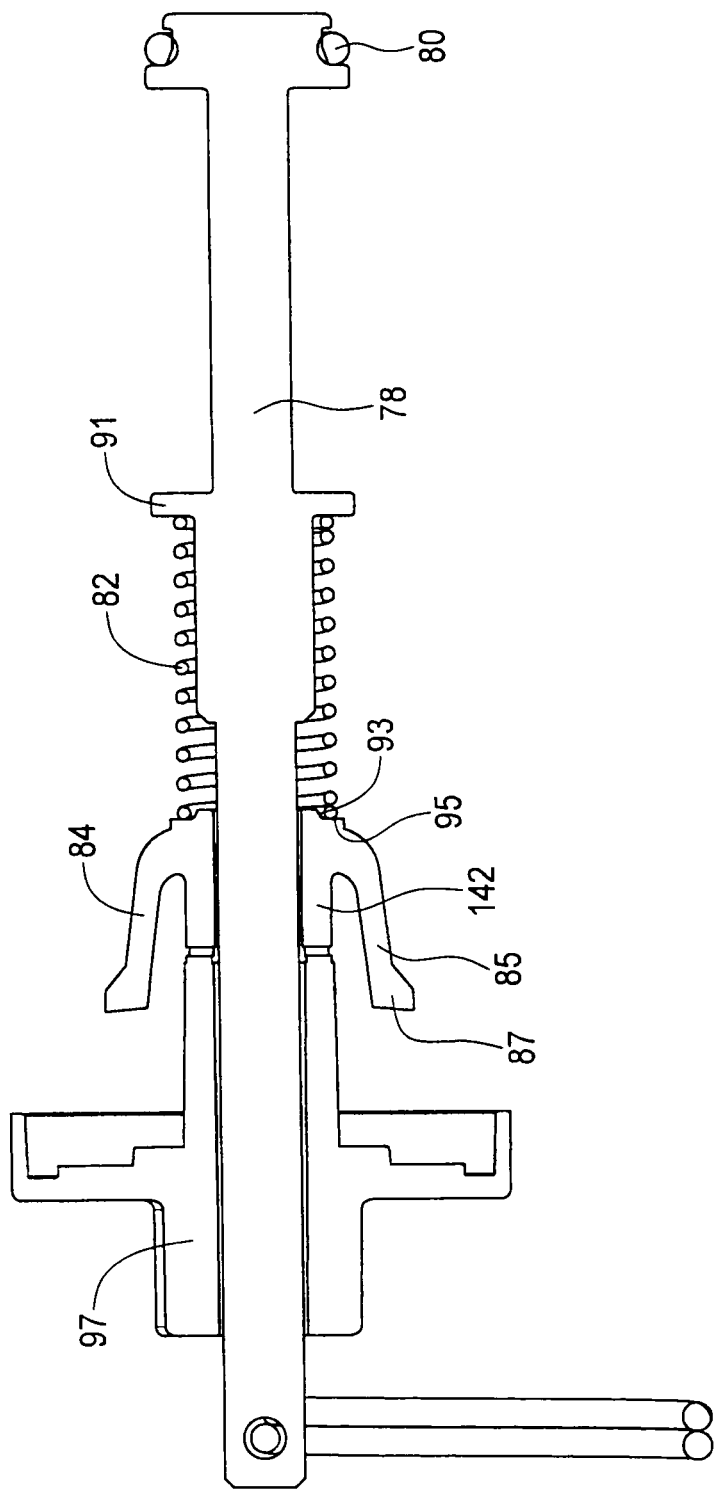
FIG. 13 is a cross-sectional view of a pressure relief valve.

With reference to FIGS. 3A and 13, valve member 78 protrudes through a spring retainer 84. Low rate spring 82 is contained between a flange 91 formed on valve member 78 and spring retainer 84. In the illustrated embodiment, spring retainer 84 has a generally cylindrical centre portion 142 disposed around valve member 78 and in sliding contact therewith. Four legs 85 extend axially and radially outwardly from centre portion 142 and terminate in feet 87. Feet 87 are engageable with receiving notches 89 formed in the body of plunger 64 to thereby secure spring retainer 84 within the bore 64D of plunger 64 and retain low rate spring 82 in compressed engagement with a flange 91 on valve member 78. The degree to which spring retainer 84 securely holds spring 82 may be adjusted by altering the length and/or width of legs 85 and feet 87. As shown in FIG. 13, a centering feature such as an angled surface 93 may be provided to contact one end of spring 82 to assist in centering spring 82 on a spring contacting surface 95 of spring retainer 84, thus providing more repeatable activation. Alternatively, the centering feature could be a projecting ring or a plurality of projections (not shown) extending axially inwardly from the outer edges of spring surface 95 and positioned to align the outer edges of spring 82 in the desired location.

As valve member 78 moves axially outwardly, gases can escape from housing 20 by way of a venting gap 148 (FIG. 11) between valve member 78 and the outer end 64B of plunger 64. Increasing the size of the venting gap can permit for higher flow. Increasing the length of valve member 78 may allow for easier re-assembly of the pressure relief valve 34 into internal fault indicator 22 after activation. A ring or other graspable member 88 may be attached at the outer end of valve member 70 to permit manual venting of housing 20 (i.e. by pulling outwardly on valve member 78). Combining an internal fault indicator and a pressure relief valve in a single device avoids the need to provide two apertures in housing 20 and conserves space within housing 20.

A dust cover 97 may be provided and inserted over pressure relief valve 34 to prevent intrusion of debris or other matter from the external environment into pressure relief valve 34 while still permitting water egress. Dust cover 97 may be configured to float in and out to achieve these functions. Dust cover 97 preferably covers both the outer end 64B of plunger 64 and outer end 56D of barrel 56, and may have an outer lip 111 (shown in the embodiment of FIG. 11) that extends axially inwardly and overlaps a portion of outer end 56D of barrel 56. Dust cover 97 may include an installation tab 99 on its outer face, which may be oriented vertically or horizontally to assist in distinguishing when pressure relief valve 34 has been properly installed.

Figure 14A:
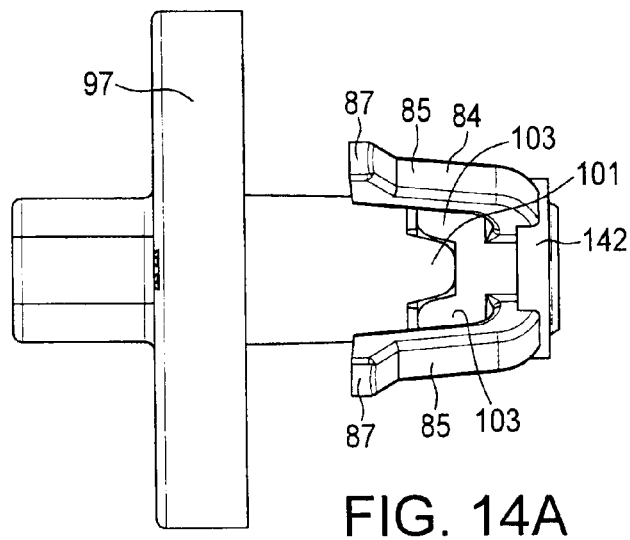
FIG. 14A shows a side view of a dust cover engaged with a spring retainer for a pressure relief valve of an embodiment of an internal fault indicator.
Figure 14B:
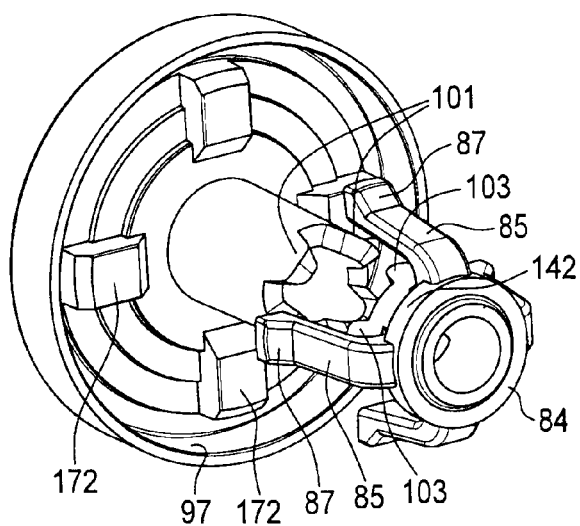
FIG. 14B is an exploded perspective view of the embodiment of FIG. 14A.
Figure 14C:
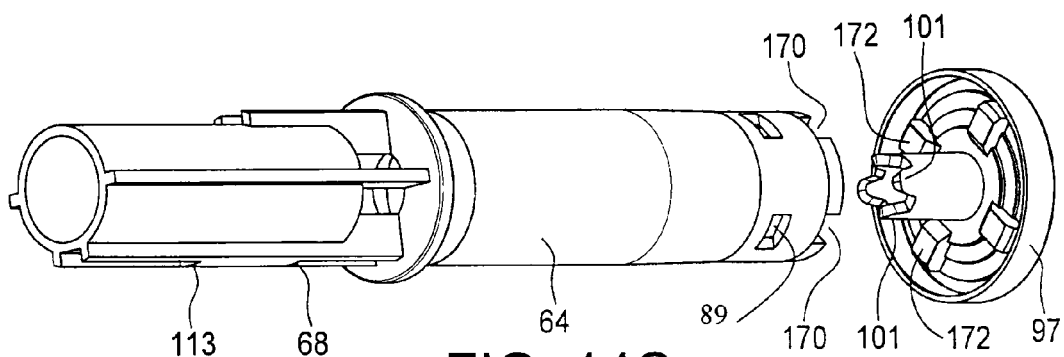
FIG. 14C is an exploded perspective view of the embodiment of FIG. 14A showing the engagement of features on the dust cover and the plunger for ensuring the pressure relief valve is properly installed.

To facilitate installation of pressure relief valve 34 by allowing valve 34 to be rotated until feet 87 of spring retainer 84 engage with receiving notches 89, a plurality of insert tabs 101 may be provided at the inner end of dust cover 97. Insert tabs 101 are dimensioned and positioned to engage with a plurality of corresponding insert tabs 103 provided on the outer edge of centre portion 142 of spring retainer 84. Insert tabs 101 and/or 103 may have rounded edges, as best shown in FIGS. 14A-14C, to prevent pressure relief valve 34 from being easily twisted and thereby snapped free of device 22 after pressure relief valve 34 has been installed.

To further assist installation, dust cover 97 may be provided with crosshairs or a mark or other visual indicia to assist in inserting pressure relief valve 34 and dust cover 97 in the correct orientation. Alternatively or additionally, one or more guide channels (not shown) may be formed within bore 64D of plunger 64 to receive and guide feet 87 to receiving notches 89.

To facilitate the correct assembly of device 22, outer end 64B of plunger 64 may optionally be provided with a plurality of notches 170 (FIG. 14C) that are positioned and dimensioned to engage with a plurality of corresponding tabs 172 on the inner surface of the outer perimeter of dust cover 97. In some embodiments, notches 170 and tabs 172 are spaced apart in 90° intervals. If pressure relief valve 34 is not correctly installed, it may be difficult or impossible to insert tabs 172 into notches 170, thereby preventing device 22 from being improperly assembled. Although notches 170 and tabs 172 can assist in ensuring that device 22 has been properly assembled, notches 170 and tabs 172 can potentially interfere with the repeatable activation of device 22 if their design is not carefully optimized. Notches 170 and tabs 172 are examples of engageable surface features on components of indicator 22 that help to ensure pressure relief valve 34 has been properly installed. Other types of projections engageable with correspondingly dimensioned receiving notches, or with additional suitably shaped engageable projections, could be provided to likewise ensure that components of device 22 can properly engage with each other only if pressure relief valve 34 has been properly installed.

To install indicator 22, the exact order of assembly of the component parts is not critical. In one exemplary embodiment, to assemble indicator 22, inner portion 56A is snapped into groove 76 of splash guard assembly 74 and is retained thereto by resilient outer edges 76A of groove 76. Longitudinally extending retaining arms 81 may be provided on barrel 56 to better engage with and retain outer edges 76A. When barrel 56 is received in groove 76, groove 76 engages and grips barrel 56. Barrel stop ring 75 and seal 73 may be threaded over outer end 64B of plunger 64 and eject spring 66 may be inserted within receiving cavity 115 of plunger 64. Plunger 64 may then be slid within bore 56C of barrel 56 so that eject spring 66 is biased against inner end 56E of barrel 56. Outer portion 56B of barrel 56 may then be threadingly engaged with inner portion 56A and pressure relief valve 34 may be assembled by threading spring 82 over movable valve member 78 and then threading spring retainer 84 over valve member 78.

The assembly may be inserted within outer end 64B of plunger 64, and feet 87 engaged with receiving notches 89 to secure pressure relief valve 34 in place, using engagement of locating tabs 103 on spring retainer 84 and 101 on dust cover 97 to insert and rotate pressure relief valve 34 appropriately. Diaphragm 40 may be positioned to contact splash guard assembly 74, so that trigger pin 50 engages with trigger notch 68 to retain indicator 22 in the armed position. Shell 33 may then be secured to splash guard assembly 74, with O-ring 48 interposed between shell 33 and diaphragm 40. Outer portion 56B may then be inserted outwardly through hole 24, and then gasket 58 and nut 60 can be secured thereto to secure device 22 in place.

Figure 15:
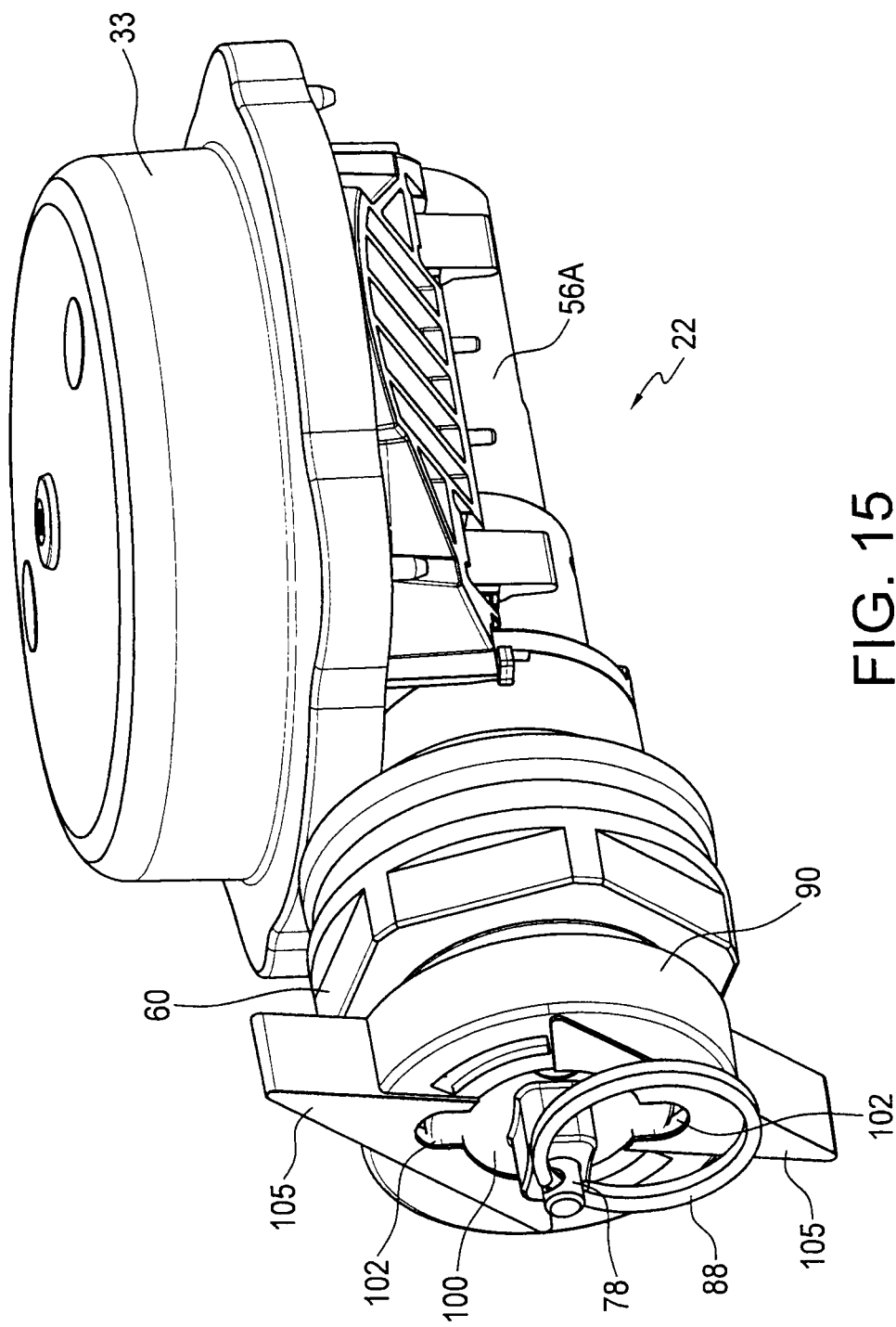
FIG. 15 is a perspective view of an embodiment of an internal fault detector including an installed shipping lock.

The outer end 56D of barrel 56 can receive a locking device that prevents plunger 64 from accidentally moving to its triggered position before internal fault indicator 22 is put into service. For example, FIG. 15 shows an internal fault indicator 22 wherein a locking device in the form of a shipping lock 90 is installed. Shipping lock 90 attaches to outer end 56D of barrel 56 and blocks plunger 64 from moving outward in bore 56C. Shipping lock 90 can be kept in place until after transformer 16 has been installed, and may be configured to allow diaphragm 40 to float when shipping lock 90 is in place, e.g. by compressing eject spring 66 slightly so that trigger pin 50 is slightly spaced apart from trigger notch 68, to prevent trigger pin 50 from shifting upwardly out of trigger notch 68 during shipping. After transformer 16 has been installed, and before transformer 16 has been put into service, shipping lock 90 is removed.

Figure 16A:
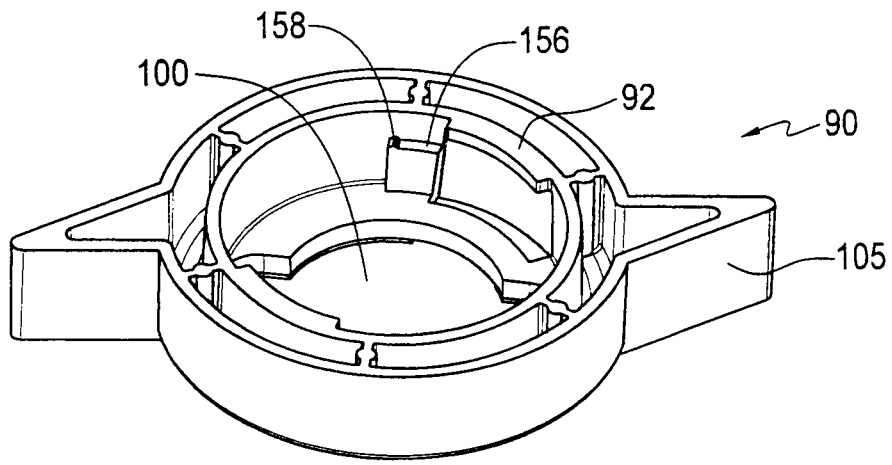
FIG. 16A is a close up view of an embodiment of a shipping lock.
Figure 16B:
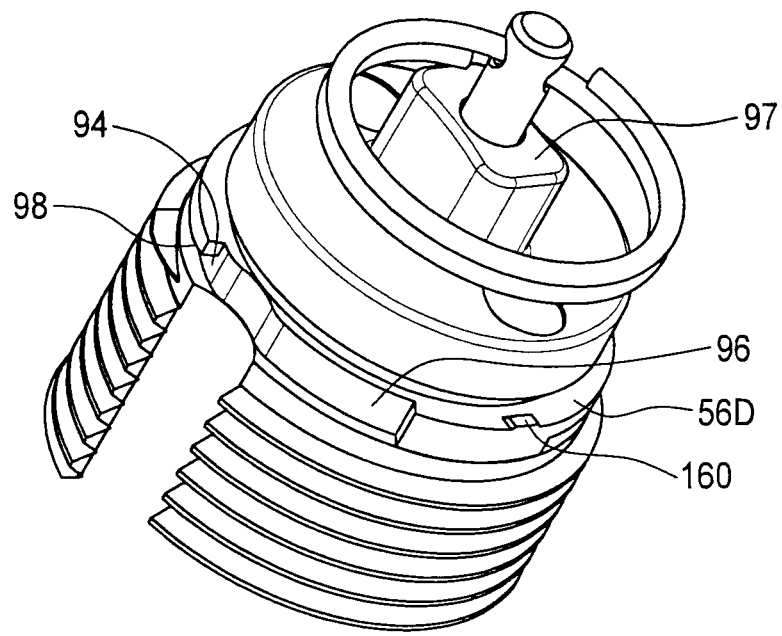
FIG. 16B is a close up perspective view of the outer end of a barrel of an embodiment of an internal fault indicator showing the features that engage with the shipping lock.

In the illustrated embodiment, shipping lock 90 comprises a pair of inwardly directed flanges 92 (best shown in FIG. 16A) which engage receiving slots 94 on outer end 56D of barrel 56. With reference to FIG. 16B, receiving slots 94 are formed with a receiving portion 96, which opens toward the outer end 56D of barrel 56 to receive flanges 92, and a securing portion 98. Flanges 92 may be fully inserted into receiving portion 96, and then shipping lock 90 may be twisted to secure flanges 92 in securing portion 98 of receiving slots 94. In one embodiment, outer end 56A is provided with four receiving slots 94 equally spaced at 90° intervals. Inserting flanges 94 into receiving portion 96 and rotating shipping lock 90, e.g. 45° or 90° in some embodiments, thus secures shipping lock 90 onto barrel 56. Other numbers and orientations of receiving slots 94 and flanges 92 may be used to secure shipping lock 90 to fault indicator 22. In some embodiments, the position and orientation of slots 94 and flanges 92 is such as to provide a specific orientation of shipping lock 90 when properly installed. Thus, for example, shipping lock 90 may include extending arms 105, to provide a readily observable visual indication that shipping lock 90 has been installed in the correct orientation. For example, extension of arms 105 in the vertical direction could indicate that shipping lock 90 has been installed correctly, as illustrated in FIG. 15.

A mechanical lock may be provided on shipping lock 90 to provide greater resistance to secure shipping lock 90 in place. For example, in the illustrated embodiment of FIGS. 16A-16B, a small recess 156 is formed on a supporting projection 158 on shipping lock 90. A corresponding engageable projection 160 is formed on the outer end 56D of barrel 56 that engages and sits within recess 156 when shipping lock 90 is in its fully installed position. Shipping lock 90 may be provided with an aperture 100 for accommodating a ring or other graspable member (illustrated as 88) on pressure relief valve 34 when shipping lock 90 is secured. Aperture 100 may include radial extensions 102 for permitting ring 88 to readily be passed through shipping lock 90 in only one orientation. When fault indicator 22 has been deployed and is ready for use, shipping lock 90 may be removed, thereby placing fault indicator 22 in an armed position.

Other types of engagement could be used to removably secure shipping lock 90 to barrel 56 prior to deployment; for example, projections could be provided in place of flanges 92 to engage in a friction fit with appropriately located cavities in place of slots 94. Moreover, the orientation of flanges 92 and slots 94 could be reversed, so that flanges 92 are formed on barrel 56 and corresponding slots 94 could be formed in shipping lock 90. The locking member could alternatively be secured by threaded engagement with barrel 56. Alternatively, the locking device could be a pin (not shown) which passes through an aperture in plunger 64 and therefore prevents plunger 64 from moving longitudinally in barrel 56 until the pin is removed. The locking device could also be, for example, a sliding or pivoting or break-away member at the outer end of plunger 64 which blocks plunger 64 from moving outwardly in barrel 56.

Figure 17A:
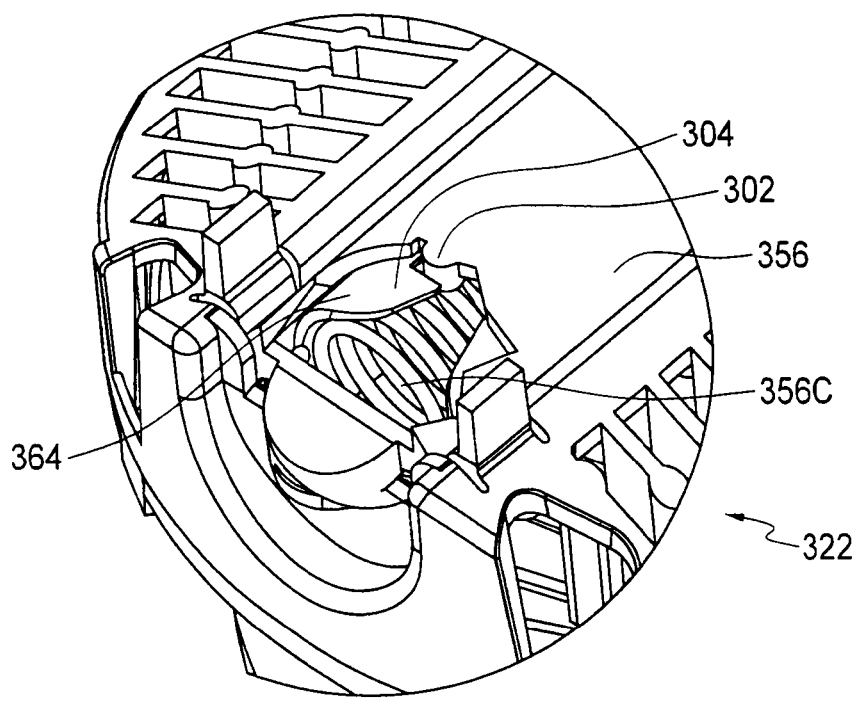
FIGS. 17A and 17B show detailed partially cut away views illustrating a locking mechanism of an embodiment of an internal fault indicator in locked and unlocked configurations, respectively.
Figure 17B:
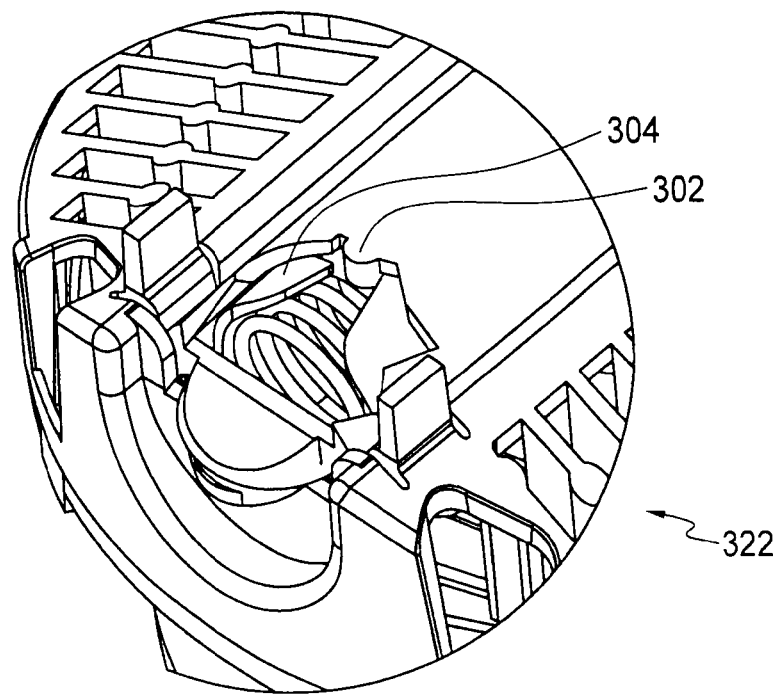

With reference to FIGS. 17A and 17B, in an alternative embodiment, a fault indicator 322 may be provided with an alternative disabling mechanism to prevent fault indicator 322 from being triggered prior to deployment. Fault indicator 322 functions in a similar manner to fault indicator 22, and parts of fault indicator 322 which provide similar functions to parts of fault indicator 22 have been assigned reference numerals which are incremented by 300 in comparison to the corresponding reference numerals used above. In the illustrated embodiment the disabling mechanism comprises a pin 302 which projects into bore 356C of barrel 356 and a hook 304 formed in plunger 364. Fault indicator 322 can be disabled by rotating plunger 364 within bore 356 until hook 304 engages pin 302 as shown in FIG. 17A. When it is desired to enable the operation of fault indicator 322, plunger 364 can be rotated until hook 304 is completely disengaged from pin 302 as shown in FIG. 17B. In indicator 322, plunger 364 is appropriately sized and configured so as to be rotatable within barrel 356.

Internal fault indicator 22 optionally includes a facility 104 (FIG. 2) for generating a control signal when the internal fault indicator is triggered. This facility may include one or more sets of electrical contacts which close or open when internal fault indicator 22 is triggered. The electrical contacts may be operated to generate the control signal, for example, by the passage of plunger 64 in bore 56C, or by the motion of trigger pin 50. The electrical contacts may be in a first position (either closed or open) when plunger 64 is in its armed position. As internal fault indicator 22 is triggered, the electrical contacts are switched so that when plunger 60 is in its triggered position, the contacts are in a second position (either open or closed). Facility 104 may comprise other mechanisms such as fiber optics for communicating a control signal indicating to transmitter 106 that internal fault indicator 22 has been triggered. A transmitter 106 generates a fault signal such as a radio signal in response to the control signal.

Embodiments of an internal fault indicator can be designed to project from housing 20 by only a minimal amount. Such a design can limit any surfaces to which snow and ice are likely to adhere, for example.

Where an internal fault indicator such as 22 or 322 will be used in electrical apparatus, the fault indicator should be designed and constructed to provide longevity and high reliability under all expected operating conditions. Further, components of internal fault indicator 22 or 322 should, as much as possible, be made from non-conductive materials so as to interfere as little as possible with the distribution of electric fields in the device. Examples of suitable materials for O-ring 48 and gasket 58 include Viton™ fluoroelastomer, nitrile butadiene rubber (NBR), hydrogenated nitrile butadiene rubber (HNBR), or silicon.

While a number of exemplary aspects and embodiments have been discussed above, those of skill in the art will recognize certain modifications, permutations, additions and sub-combinations thereof. For example:

the single orifice 38 shown in the drawings could be replaced with a number of smaller orifices or some other construction which limits the rate at which the pressure within chamber 36 can follow fluctuations in the ambient pressure within housing 20;

the shape of orifice 38 may be annular, as illustrated, or some other shape;

in place of chamber 36 closed on one side by a flexible diaphragm 40, actuator mechanism 30 could comprise a chamber closed by both a relatively high mass piston and a relatively low mass piston as described in U.S. Pat. No. 5,078,078 to Cuk. The two pistons may be concentric with one another and are connected to springs having the same spring constant. The inertia of the large mass piston prevents the large mass piston from moving in response to sudden pressure surges. The large mass piston and the small mass piston can both move in response to slow pressure fluctuations. Relative motion of the large mass and small mass pistons can be used to release indicator mechanism 32;

chamber 36 may comprise the interior of a bellows having rigid end faces joined by a flexible cylindrical wall. Relative motion of the rigid end faces can trigger indicator mechanism 32 by way of a suitable mechanical linkage. One or more openings in the bellows will prevent the end faces from moving in response to slow fluctuations in the ambient pressure within housing 20;

in non-preferred embodiments of the invention, diaphragm 40 could be replaced with a rigid or semi-rigid movable piston which is displaced toward chamber 36 in response to sudden pressure surges within housing 20;

a chamber 36 closed on one side by a diaphragm, as described above, for example, or any of these alternative mechanisms constitute "pressure surge detecting means" which respond to surges in pressure within housing 20 by moving a portion of a wall of a cavity with a force sufficient to operate an indicator mechanism 32; or plunger 64 may have a different shape from the shape described above, for example, plunger 64 could comprise a flag, rod, plate, or the like having hidden portions which are hidden from view within bore 56C when plunger 64 is in its armed position and are revealed when plunger 64 moves to a triggered position. A plunger 64 as described above, and any of the alternatives described herein for displaying an indication that internal fault indicator has detected a fault, constitute "indicator means".

It is therefore intended that the following appended claims and claims hereafter introduced are interpreted to include all such modifications, permutations, additions and sub-combinations as are within their true spirit and scope.

What is claimed is:

1. A fault indicator for indicating the occurrence of a rapid pressure surge within a housing of an electrical device, the fault indicator comprising:
   (a) a barrel capable of being mounted in an aperture in the housing;
   (b) an actuating mechanism comprising:
      (i) a chamber within the housing, the chamber having at least one orifice communicating between interior and exterior surfaces of the chamber; and
      (ii) an actuating member movable in response to a pressure differential between the interior and exterior surfaces of the chamber;
   (c) a plunger within a bore of the barrel, the plunger biased outwardly in the barrel and normally retained in an armed position by the actuating member; and
   (d) a radial seal disposed between the plunger and the barrel so as to permit relative motion of the plunger and the barrel;

wherein, when the pressure differential exceeds a positive threshold value, the actuating member is moved and thereby permits the plunger to move outwardly into a triggered position, and wherein the radial seal is sealingly engaged with both the plunger and the barrel in both the armed position and the triggered position.

2. A fault indicator according to claim 1, wherein the radial seal is sealingly engaged with the plunger and the barrel while the plunger moves outwardly from the armed position to the triggered position.

3. A fault indicator according to claim 1, wherein the chamber comprises a diaphragm and the actuating member is coupled to the diaphragm.

4. A fault indicator according to claim 3 comprising an O-ring in sealing engagement with an outer perimeter of the diaphragm and an outer perimeter of the chamber.

5. A fault indicator according to claim 3, wherein the actuating member comprises a trigger pin projecting from the diaphragm, the trigger pin engaging a trigger notch in the plunger when the plunger is in the armed position.

6. A fault indicator according to claim 5 comprising a spring urging the plunger outwardly in the bore, wherein the spring extends into a cylindrical opening on an inner end of the plunger and wherein, upon triggering, the spring can push the plunger to a position wherein a portion of the plunger is engaged with the trigger pin to prevent the plunger from being moved back to the armed position.

7. A fault indicator according to claim 1, wherein at least a portion of an exterior surface of the plunger is brightly colored.

8. A fault indicator according to claim 3, wherein the diaphragm comprises a sheet of stiff material formed to provide a number of concentric annular ridges.

9. A fault indicator according to claim 8 comprising a spindle disposed to support the diaphragm.

10. A fault indicator according to claim 1, wherein the seal comprises a dual-lip seal.

11. A fault indicator according to claim 10, wherein the seal is formed by overmolding.

12. A fault indicator according to claim 10, wherein the seal comprises Alcryn™ melt-processible rubber.

13. A fault indicator according to claim 1 comprising a diaphragm positioning member.

14. A fault indicator according to claim 13, wherein the diaphragm positioning member comprises a pair of opposed projecting tabs that engage with an upper surface of the barrel.

15. A fault indicator according to claim 1 comprising a pressure relief valve integral with the plunger.

16. A fault indicator according to claim 15, wherein the pressure relief valve comprises an axially movable valve member disposed within a bore of the plunger and biased into engagement with a valve seat by a spring, and wherein one end of the spring contacts a centering feature formed on the valve member.

17. A fault indicator according to claim 16 comprising a spring retainer disposed with the bore of the plunger to secure the spring and a dust cover engageable with an outer end of the plunger, wherein the spring retainer comprises a first plurality of insert tabs and the dust cover comprises a second plurality of insert tabs, the first and second plurality of insert tabs being sized and disposed to be engageable when the pressure relief valve is installed.

18. A fault indicator according to claim 17, wherein one or both of the first and second plurality of insert tabs comprise rounded edges.

19. A fault indicator according to claim 17, wherein the spring retainer comprises a plurality of securing feet and the plunger comprises a plurality of securing notches positioned to receive the securing feet in the installed position.

20. A fault indicator according to claim 19, wherein the plunger comprises at least one locating channel positioned to guide at least one of the securing feet to a corresponding securing notch.

21. A fault indicator according to claim 15 comprising engageable surface features on components of the fault indicator that engage to allow assembly of the fault indicator only if the pressure relief valve has been properly installed.

22. A fault indicator according to claim 21 further comprising a dust cover, wherein the engageable surface features comprise a plurality of notches on an outer end of the plunger and a plurality of correspondingly sized and shaped locating tabs on the dust cover.

23. A fault indicator according to claim 1 comprising a disabling mechanism, the disabling mechanism comprising a member projecting inwardly into the barrel and a hook on the plunger that engages the member to prevent the plunger from moving outwardly in the barrel when the plunger is rotated in the barrel in a first sense.

24. A fault indicator according to claim 1 comprising a splash cover integrally formed with a spacer, the splash cover being mountable on the barrel and the spacer being dimensioned and positioned to engage with an outer perimeter of the actuating member.

25. A fault indicator according to claim 1 comprising a stop ring disposed within the bore of the barrel and positioned to prevent complete ejection of the plunger when the fault indicator is triggered.

26. A fault indicator according to claim 25, wherein the stop ring comprises a plurality of axially inwardly extending arms defining drainage channels therebetween.

27. A fault indicator according to claim 26, wherein the stop ring further comprises a plurality of radially inwardly extending projections.

28. A fault indicator according to claim 1 comprising a removable lock on an outer end of the barrel, the lock blocking outward motion of the plunger in the bore.

29. A fault indicator according to claim 28, wherein the lock comprises a radially inwardly directed flange and the outer end of the barrel comprises one or more than one receiving slot, the flange and the receiving slot being engageable to secure the lock to the barrel.

30. A fault indicator according to claim 29 comprising two opposed radially inwardly directed flanges and four receiving slots, the receiving slots being positioned at 90° intervals about the outer end of the barrel, wherein the slots are dimensioned so that rotation of the lock by 90° secures the lock to the barrel.

31. A fault indicator according to claim 1 comprising a one-way mechanism in the bore which prevents the plunger from being pushed from the triggered position back to the armed position.

32. A fault indicator according to claim 31, wherein the one-way mechanism comprises a trigger pin on the actuating member that is engageable with a securing notch on the barrel when the fault indicator is in the triggered position.

33. A fault indicator according to claim 1, wherein the barrel comprises two separate portions that may be coupled together.

34. A fault indicator according to claim 33, wherein the two separate portions are threadably engageable, the outer portion further comprising a projection that is engageable with surfaces on a splash cover of the fault indicator when the fault indicator is assembled to prevent relative rotation of the two separate portions.

35. A fault indicator according to claim 1 comprising a signal transmitter connected to broadcast a fault signal upon actuation of the fault indicator.

36. A fault indicator according to claim 1 comprising a set of electrical contacts, the electrical contacts being closed or open when the plunger is in its armed position and the electrical contacts switching to open or closed when the plunger is in its triggered position.

37. An electrical device having a closed housing, a fault indicator according to claim 1 with the chamber in the housing and the barrel projecting through an aperture in the housing, and one or more active electrical components within the housing.

38. An electrical device according to claim 37, wherein the device is a pole-mounted transformer.

39. An electrical device according to claim 37, wherein the device is a pad mounted transformer.

40. A fault indicator according to claim 1, wherein the radial seal is disposed within the barrel to sealingly engage the inner surface of the barrel.

41. A fault indicator for indicating the occurrence of a rapid pressure surge within a housing of an electrical device, the fault indicator comprising:
(a) a barrel capable of being mounted in an aperture in the housing;
(b) pressure surge detecting means for moving an actuating member in response to a rapid rise in pressure within the housing of an electrical device;
(c) indicator means actuated by the pressure surge detecting means, the indicator means comprising a plunger movably disposed within a bore of the barrel, the plunger being biased for outward movement in the bore from an armed position to a triggered position upon movement of the actuating member; and
(d) a radial seal disposed within the bore and around the plunger,
the radial seal being configured to maintain a sealing engagement with the plunger in both the armed and triggered positions while permitting relative motion of the plunger and the bore between the armed and triggered positions.

* * * * *